United States Patent
Banda

(10) Patent No.: US 9,474,259 B2
(45) Date of Patent: Oct. 25, 2016

(54) KNOT MAKER (TKM)

(71) Applicant: Emilio Alejandro Banda, New York, NY (US)

(72) Inventor: Emilio Alejandro Banda, New York, NY (US)

(*) Notice: Subject to any disclaimer, the term of this patent is extended or adjusted under 35 U.S.C. 154(b) by 65 days.

(21) Appl. No.: 14/660,550

(22) Filed: Mar. 17, 2015

(65) Prior Publication Data
US 2015/0264908 A1    Sep. 24, 2015

Related U.S. Application Data

(60) Provisional application No. 61/954,795, filed on Mar. 18, 2014.

(51) Int. Cl.
*A01K 91/047* (2006.01)
*A01K 91/04* (2006.01)

(52) U.S. Cl.
CPC ............. *A01K 91/047* (2013.01); *A01K 91/04* (2013.01)

(58) Field of Classification Search
CPC ..... A01K 91/04; A01K 91/047; B65H 69/04
USPC ........................................ 289/1.5, 1.2, 2, 17
See application file for complete search history.

(56) References Cited

U.S. PATENT DOCUMENTS

| | | | | |
|---|---|---|---|---|
| 110,498 A * | 12/1870 | Randall | ............... | B65H 69/04 289/12 |
| 154,342 A * | 8/1874 | Reinwarth | ............... | D07B 7/14 57/11 |
| 269,046 A * | 12/1882 | Gordon | ............... | B65H 69/04 242/146 |
| 322,015 A * | 7/1885 | Shepard | ............... | A01D 37/02 289/2 |
| 2,498,920 A | 6/1947 | Holland | | |
| 2,469,037 A * | 5/1949 | Harvey | ............... | A01K 91/04 289/1.5 |
| 2,773,713 A | 11/1955 | Smalley | | |
| 2,783,571 A * | 3/1957 | Stilwell | ............... | A01K 91/04 223/99 |
| 2,947,558 A * | 8/1960 | Bethune, Jr. | ............ | A01K 91/04 289/2 |
| 2,987,335 A * | 6/1961 | Tarbox | ............... | A01F 15/145 289/17 |
| 3,016,741 A * | 1/1962 | Kulp | ............... | A01K 91/04 43/1 |
| 3,166,035 A * | 1/1965 | Wiegand | ............... | A22C 11/127 112/104 |
| 3,212,800 A * | 10/1965 | Freudling | ............... | B65B 13/26 289/1.5 |
| 3,298,726 A * | 1/1967 | Francis | ............... | B65H 69/04 289/2 |
| 3,490,801 A * | 1/1970 | Feighery | ............... | B65H 69/046 289/2 |

(Continued)

*Primary Examiner* — Clinton T Ostrup
*Assistant Examiner* — Bao-Thieu L Nguyen
(74) *Attorney, Agent, or Firm* — Goodwin Procter LLP

(57) ABSTRACT

The invention is related in general to tools and accessories that help to tie knots for fishing. Specifically, the present invention provides a knot-tying device having a body, a controller, left and right terminal wheels that can securely hold fishing line, one or more clips, left and right apertures, and means for transferring rotational energy from the controller to the terminal wheels so that the terminal wheels rotate in a synchronized fashion when the controller is rotated. The device is capable of entwining line and thereby aids in the knot-forming process.

20 Claims, 37 Drawing Sheets

(56) References Cited

U.S. PATENT DOCUMENTS

| | | | | |
|---|---|---|---|---|
| 3,606,405 | A * | 9/1971 | Lally | A01K 91/04 289/17 |
| 3,787,081 | A * | 1/1974 | Macy | A01K 91/04 289/17 |
| 3,877,737 | A * | 4/1975 | Chappell | A01K 91/04 289/17 |
| 4,336,960 | A * | 6/1982 | Seki | A01K 91/04 289/17 |
| 4,400,025 | A | 8/1983 | Dennison | |
| 4,417,756 | A * | 11/1983 | Herke | A01K 97/28 289/17 |
| 4,871,200 | A * | 10/1989 | Ryder | A01K 91/04 289/17 |
| 5,240,295 | A * | 8/1993 | Spencer | B65H 69/04 289/1.5 |
| 5,690,369 | A * | 11/1997 | Steck, III | B65H 69/04 289/17 |
| 5,690,370 | A * | 11/1997 | Steck, III | A01K 91/047 289/17 |
| 6,209,930 | B1 * | 4/2001 | Johnston | A01K 91/04 289/17 |
| 6,401,442 | B1 * | 6/2002 | Root | A01K 97/26 57/10 |
| 6,817,634 | B2 * | 11/2004 | Champion | A01K 91/04 289/1.5 |
| 7,309,086 | B2 * | 12/2007 | Carrier | A01K 91/04 289/17 |
| 7,488,011 | B2 * | 2/2009 | Seo | A41H 37/10 289/1.5 |
| 7,494,162 | B1 | 2/2009 | Howell | |
| 7,677,613 | B2 * | 3/2010 | Chermanski | A01K 91/04 289/17 |
| 8,234,850 | B1 * | 8/2012 | Wright | A44C 27/001 57/10 |
| 8,234,851 | B2 * | 8/2012 | Wright | A44C 27/001 57/10 |
| 8,794,680 | B2 * | 8/2014 | Frew | A01K 91/04 289/17 |
| 9,109,308 | B2 * | 8/2015 | Wright | D03D 9/00 |
| 9,260,271 | B1 * | 2/2016 | Bowman, Jr. | A01K 91/04 |
| 2002/0139031 | A1 * | 10/2002 | Ragucci | A01K 97/26 43/1 |
| 2004/0107626 | A1 * | 6/2004 | Sims | A01K 91/06 43/42.06 |
| 2005/0116471 | A1 * | 6/2005 | Muir | A01K 91/04 289/17 |
| 2015/0097370 | A1 * | 4/2015 | Schumacher | A01F 15/145 289/1.5 |

\* cited by examiner

KNOT MAKER (TKM)

CROSS REFERENCE TO RELATED APPLICATION

This application claims priority to U.S. Provisional Patent Application No. 61/954,795 filed on Mar. 18, 2014, which is incorporated by reference herein.

BACKGROUND

Fishing is an outdoor activity enjoyed by many throughout the United States. Successful fishing requires the fisherman to be able to successfully tie knots in fishing line. Fly-fishing, in particular, requires the fisherman to be skilled in knot-tying.

In fly-fishing, the bait is a lightweight fly or lure. Often the fly or lure is artificial. In general, artificial flies are imitations of natural food sources which fly fishers present to their target species of fish while fly-fishing. Artificial flies are constructed by fly tying, in which furs, feathers, thread or any of very many other materials are tied onto a fish hook. The fly is designed to look like an insect that is indigenous to the location of the fish. The hook is tied to the end of a thin, lightweight length of fishing line referred to as a leader.

When fly-fishing, the fisherman generally stands in a stream or other body of water and presents the fly to the fish by casting the fly on or just above the surface of the water in which the fish is swimming. Because it is generally undesirable for the fly to sink beneath the surface of the water, the fly and leader line should be lightweight so that the fisherman's casting motion is sufficient to keep the fly at or above the surface of the water.

The leader line is attached to the main fishing line of the fisherman's fishing rod by means of a knot. When fly-fishing, the fisherman often must tie a new fly/leader onto the fishing line. For example, the fisherman may wish to try a new fly if the current fly does not appear to be attractive to the fish, or if the fisherman loses the fly by snagging the line in brush or for some other reason.

Rather than leaving the water to tie a new knot, it is preferable to tie the new knot while maintaining one's position in the water. Accordingly, the fisherman must be able to tie knots while standing in water. This aspect of fly-fishing is particularly challenging for fishermen who lack fine motor skills, hand-to-eye coordination, and/or have poor eye-sight, such as children, the elderly, and the disabled. A need exists, therefore, for a tool to help such fishermen successfully tie knots while in the water, or when out of the water.

SUMMARY

The present invention fills the need for a tool to help fishermen who lack fine motor skills, hand-to-eye coordination, and/or have poor eye-sight, to tie knots by providing a device for holding, entwining and pulling nylon lines and cords or others materials of varying thickness (hereinafter "lines") to create or recreate knots. More specifically, the present invention provides a knot tying device comprising a body, wherein the body comprises a right side, a left side, and a center; a controller, wherein the controller is attached to the body, and is capable of being manually rotated by a user of the device; a right terminal wheel, wherein the right terminal wheel is attached to the right side of the body and is capable of securely holding a line to be knotted; a left terminal wheel, wherein the left terminal wheel is attached to the left side of the body and is capable of securely holding a line to be knotted; a means for transferring rotational energy imparted to the controller to the right terminal wheel and the left terminal wheel, such that rotation of the controller results in rotation of the left terminal wheel and rotation of the right terminal wheel, wherein the left terminal wheel and the right terminal wheel rotate simultaneously, at the same speed, and in opposite directions; one or more clips, wherein the one or more clips are attached to the center of the body and positioned between the left terminal wheel and the right terminal wheel; a right side aperture, wherein the right side aperture extends from outside the body through the center of the right terminal wheel; and a left side aperture, wherein the left side aperture extends from outside the body through the center of the left terminal wheel.

These and other features, aspects, and advantages of the present invention will become better understood with regard to the following description, appended claims, and accompanying drawings.

DETAILED DESCRIPTION

The knot-tying device of the present invention is a single device comprised of individual components or parts. Each component may be made from any material that renders the component suitable for use in the device. It will be appreciated that plastic or metal are suitable materials for constructing most parts of the device.

The knot-tying device of the present invention comprises a body, a controller, a right terminal wheel, a left terminal wheel, one or more clips, a right side aperture, a left side aperture, and a means for transferring rotational energy from the controller to the left and right terminal wheels such that rotation of the controller results in synchronized, simultaneous rotation of the left and right terminal wheels in opposite directions and at the same speed. The means for transferring rotational energy from the controller to the terminal wheels is an arrangement of sprockets, gears, chains, straps, bands, or axles, or a combination of these items.

In one embodiment, the means for transferring rotational energy from the controller to the terminal wheels is an arrangement of sprockets, gears, and chains. In another embodiment, the means for transferring rotational energy from the controller to the terminal wheels is an arrangement of gears and axles.

The knot-tying device of the present invention is operated when the user manually rotates a controller. The rotational energy imparted to the controller is transferred through any combination of gears, chains, straps, or axles, to terminal wheels, causing the terminal wheels to rotate. The rotation of the terminal wheels is used to entwine one or more lines to be tied. One or more clips are positioned between the terminal wheels and hold or position the one or more lines and aid the user in producing the desired knot.

The present invention is described below in reference to the three embodiments shown in the FIGS. 1, 7, and 9.

Figure 1:
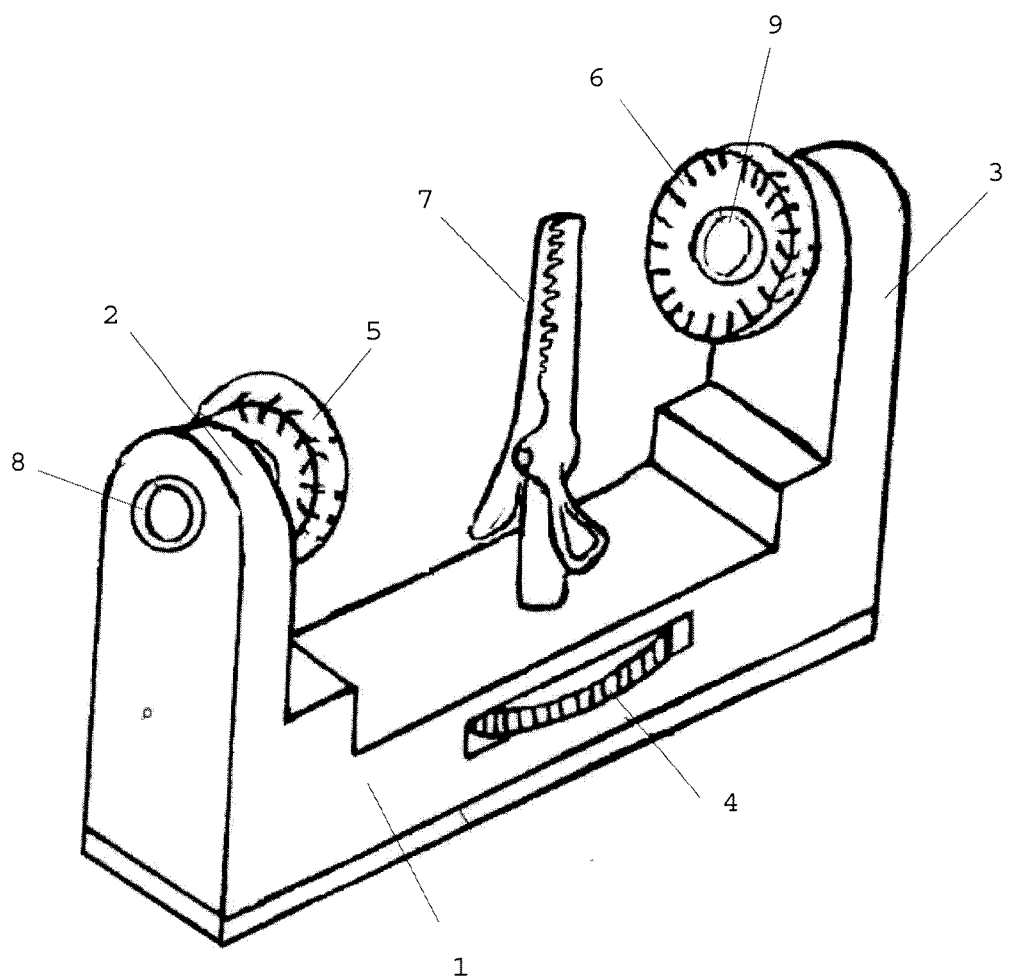
FIG. 1 shows a perspective drawing of one embodiment of the present invention.

Referring to the embodiment shown in FIG. 1, the present invention comprises a base 1, a left-side lateral elevation 2, a right-side lateral elevation 3, a controller 4, a left terminal wheel 5, a right terminal wheel 6, a clip 7, a left hollow upper sprocket 8, and a right hollow upper sprocket 9. The left and right side lateral elevations are attached to the left and right sides of the base, respectively. The left and right side lateral elevations together with the base form the body of the device. The left side of the body comprises the left-side lateral elevation; the right side of the body comprises the right-side lateral elevation. The center of the body comprises the base. Each of the left and right terminal wheels is attached to the corresponding lateral elevation by a hollow upper sprocket. The terminal wheels, which are parallel and opposite to each other, are capable of securely holding the line or lines to be entwined and knotted. The clip, which is attached to the base, is positioned between the two terminal wheels. The user rotates the controller horizontally which results in vertical rotation of the terminal wheels. The hollow upper sprockets transfer rotational energy from the controller to the terminal wheels through a series of gears and chains.

Figure 2:
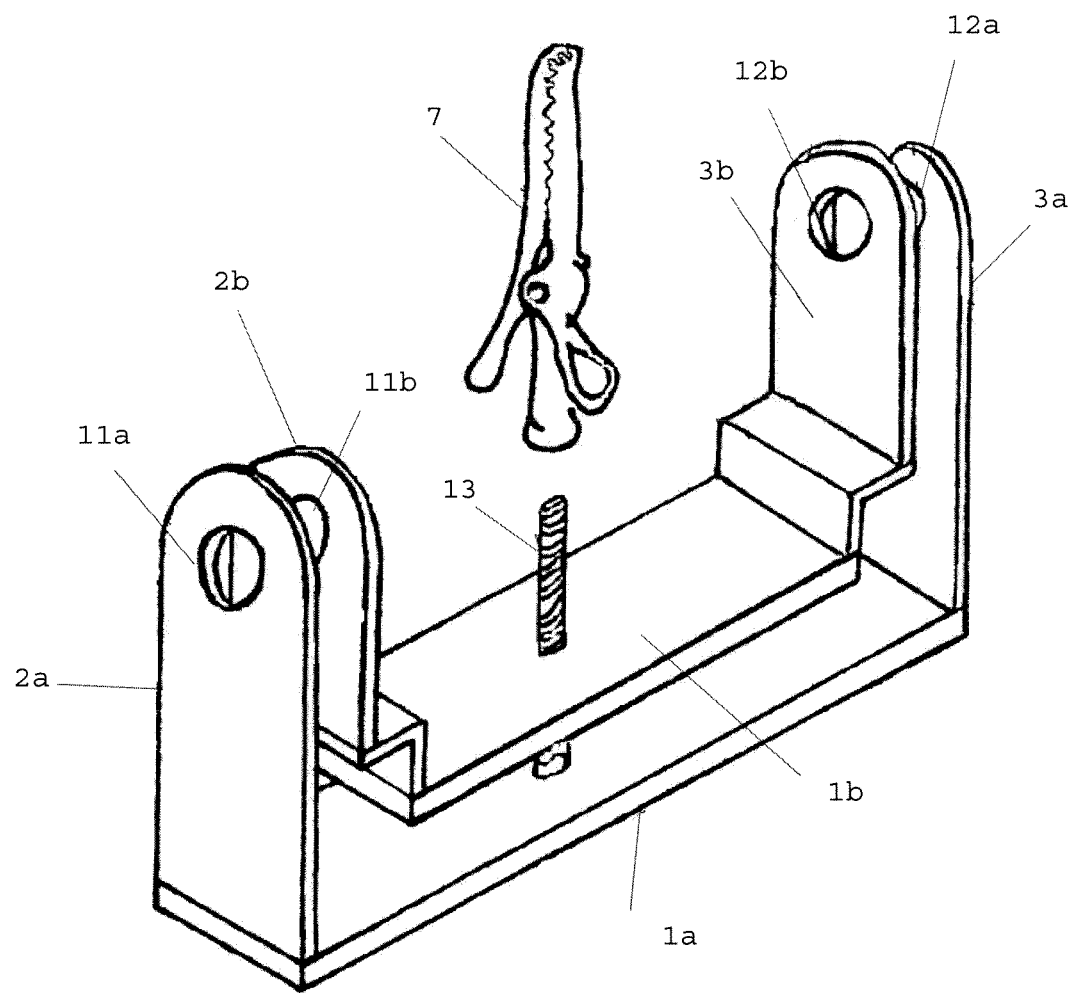
FIG. 2 shows a perspective of the interior of the base of the embodiment shown in FIG. 1.

As shown in FIG. 2, base 1 comprises two parallel rectangular panels, 1a and 1b. Left-side lateral elevation 2 comprises an external side 2a and an internal side 2b. Each of sides 2a and 2b includes an opening, 11a and 11b, respectively. Openings 11a and 11b are positioned with respect to one another such that a straight line drawn from the center of opening 11a to the center of opening 11b would be parallel to base 1. Similarly, right-side lateral elevation 3 comprises an external side 3a and an internal side 3b. Each of sides 3a and 3b includes an opening, 12a and 12b, respectively. Openings 12a and 12b are positioned with respect to one another such that a straight line drawn from the center of opening 12a to the center of opening 12b would be parallel to base 1. Openings 11a and 11b position and support upper hollow sprocket 8 (FIG. 1). Openings 12a and 12b position and support upper hollow sprocket 9 (FIG. 1). Base panels 1a and 1b together with the internal and external sides of lateral elevation 2 and 3 (i.e., 2a, 2b, 3a and 3b) make up the body of the embodiment shown in FIG. 1. Clip 7 is attached to base 1 by means of screw 13.

The internal components of the embodiment shown in FIG. 1 (FIG. 3A) include controller 4, left horizontal miter gear 17, right horizontal miter gear 18, left vertical miter gear 19, right vertical miter gear 20, base roller chain 14, left lateral elevation roller chain 15, and right lateral elevation roller chain 16.

Figure 4A:
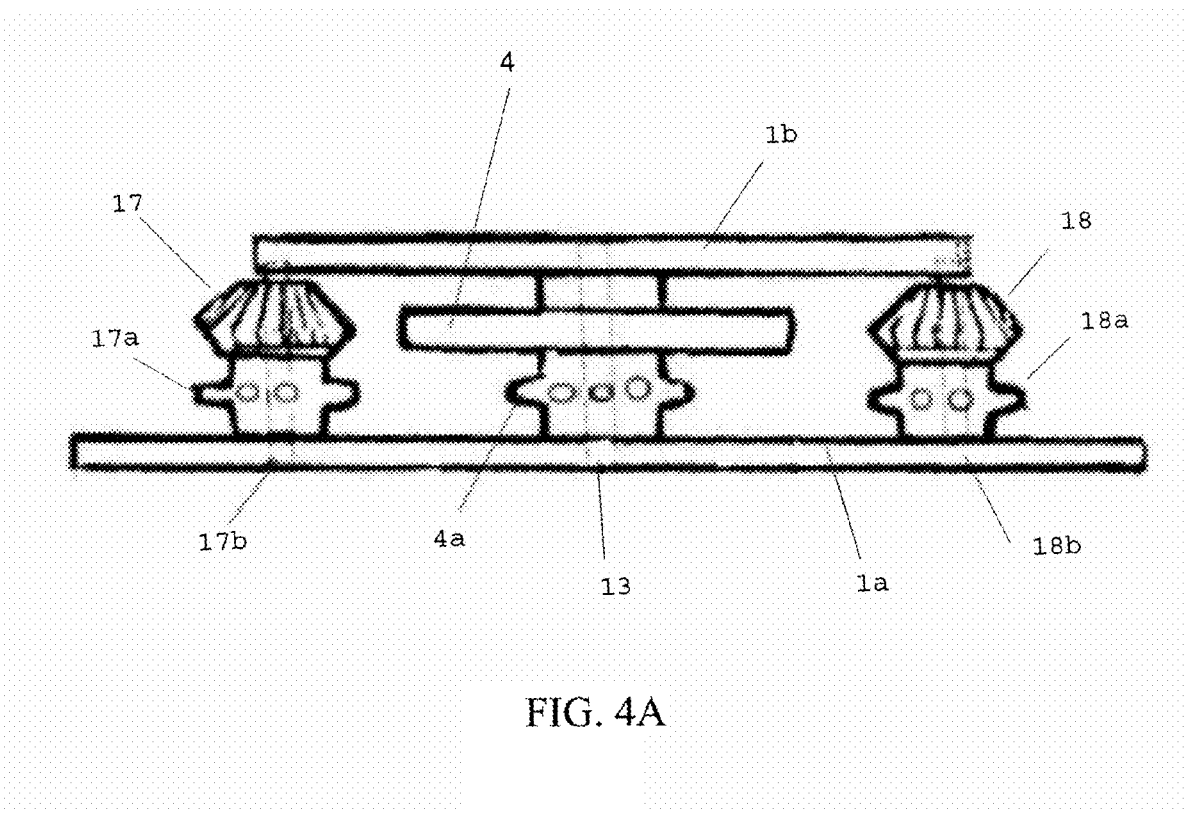
FIG. 4A is a front view of the controller, sprocket, and horizontal miter gear arrangement in the base of the embodiment shown in FIG. 1.
Figure 4B:
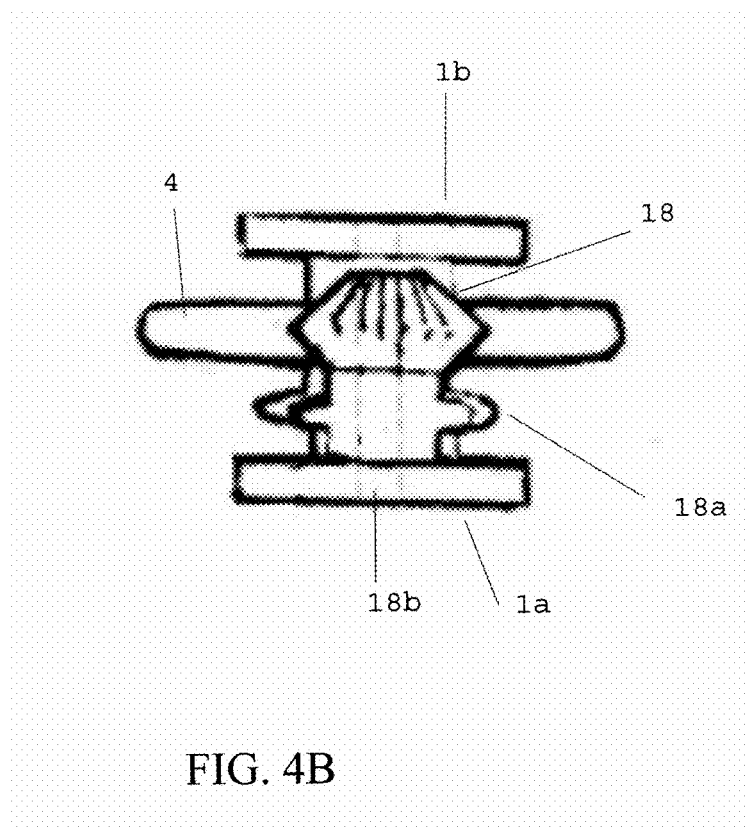
FIG. 4B is a right side view of the controller, sprocket, and horizontal miter gear arrangement in the base of the embodiment shown in FIG. 1.
Figure 4C:
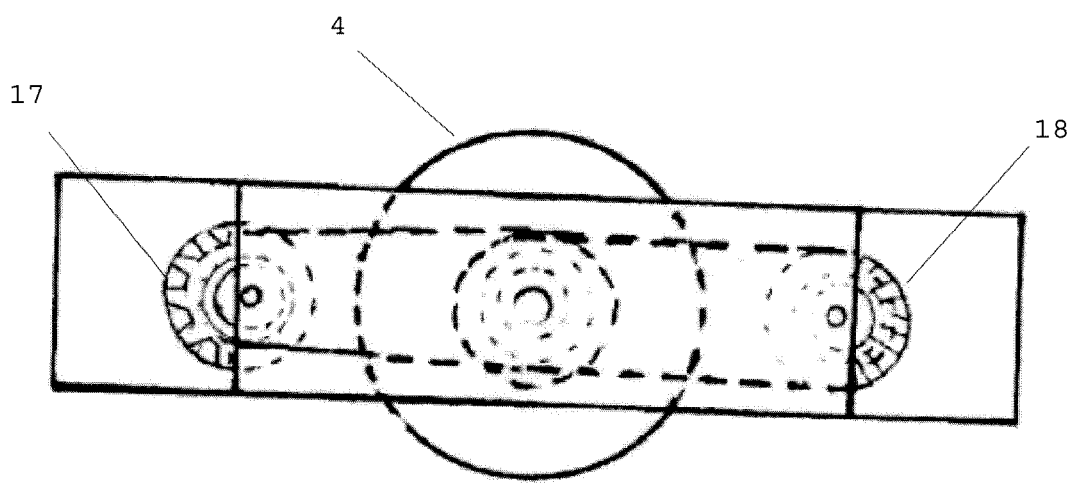
FIG. 4C is a top view of the horizontal miter gears, controller and chain in the base of the embodiment shown in FIG. 1.
Figure 4D:
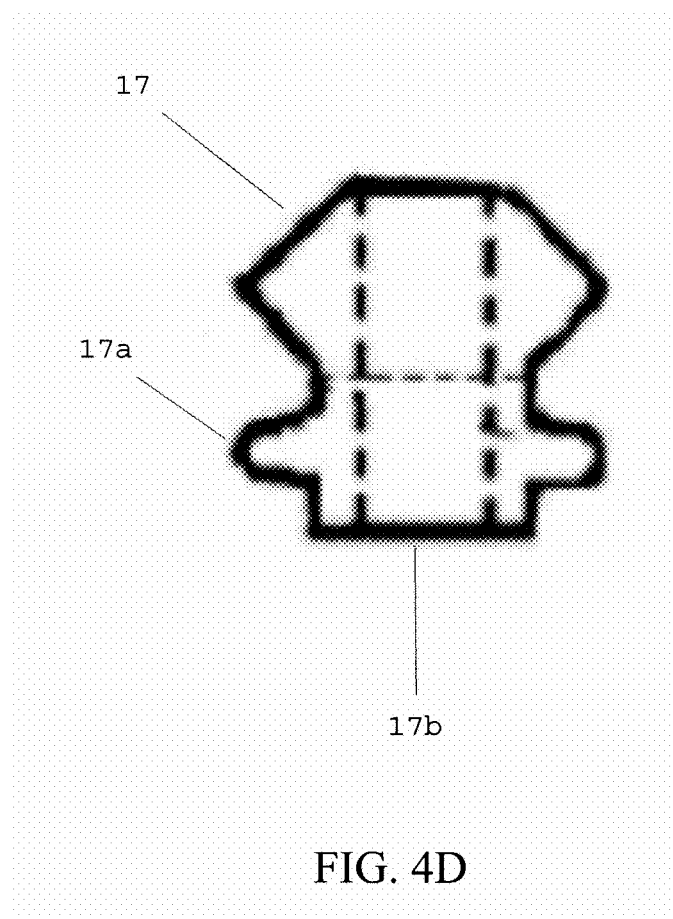
FIG. 4D is a section view showing the relationship between a horizontal miter gear, sprocket, and axle in the base of the embodiment shown in FIG. 1.

Controller 4 is attached to sprocket 4a (FIG. 4A). Both controller 4 and sprocket 4a rotate about screw 13. As controller 4 is rotated by the user, sprocket 4a rotates about screw 13 in the same direction and in proportion to the rotation of controller 4. Left horizontal miter gear 17 is attached to the left side of base 1 and is mounted on sprocket 17a such that left horizontal miter gear 17 and sprocket 17a rotate at the same rate and in the same direction around axle 17b (FIGS. 4A and 4D). Similarly, right horizontal miter gear 18 is attached to the right side of base 1 and is mounted on sprocket 18a such that right horizontal miter gear 18 and sprocket 18a rotate at the same rate and in the same direction around axle 18b (FIGS. 4A and 4B).

Figure 4E:
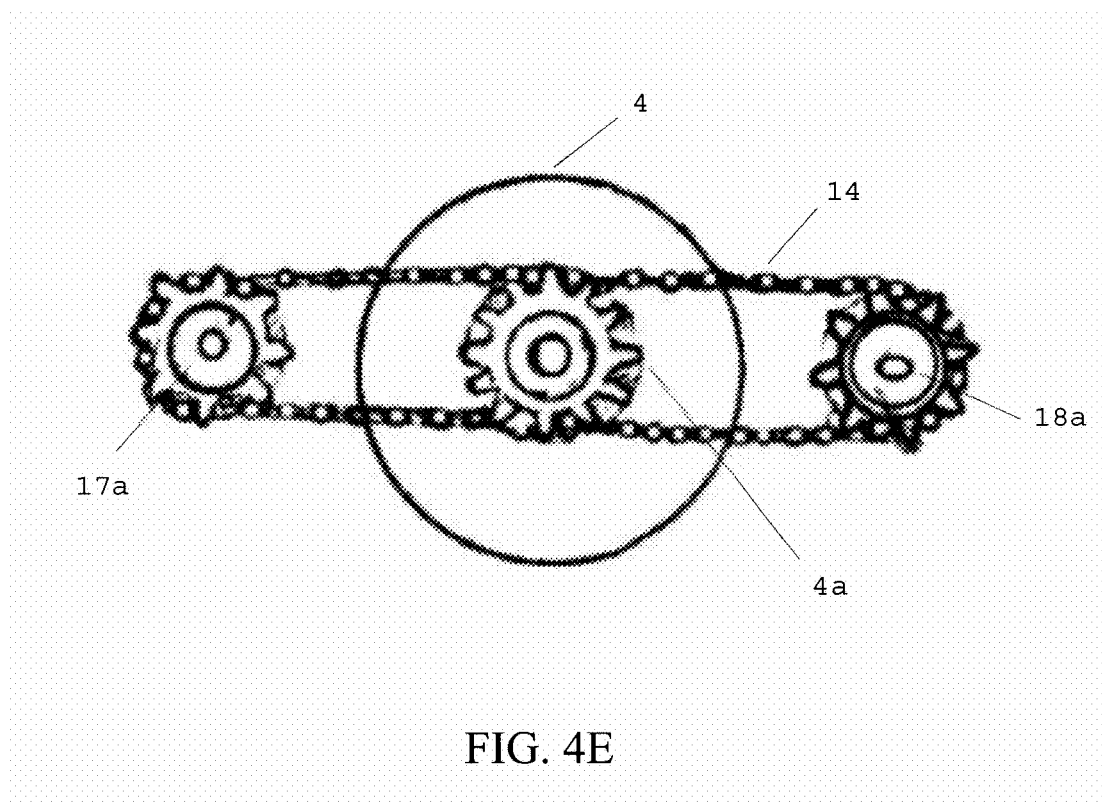
FIG. 4E is a section view of the sprockets, controller, and roller chain in the base of the embodiment shown in FIG. 1.

Base roller chain 14 engages sprockets 4a, 17a, and 18a (FIG. 4E). Rotation of controller 4 causes rotation of sprocket 4a which advances base roller chain 14, thereby causing rotation of sprockets 17a and 18a and corresponding rotation of miter gears 17 and 18 (see FIGS. 4A, 4C, and 4E). It should be noted that screw 13 and axles 17b and 18b are all vertical axles which in addition to providing an axis about which rotation of a sprocket can occur, also structurally stabilize base 1.

Figure 3A:
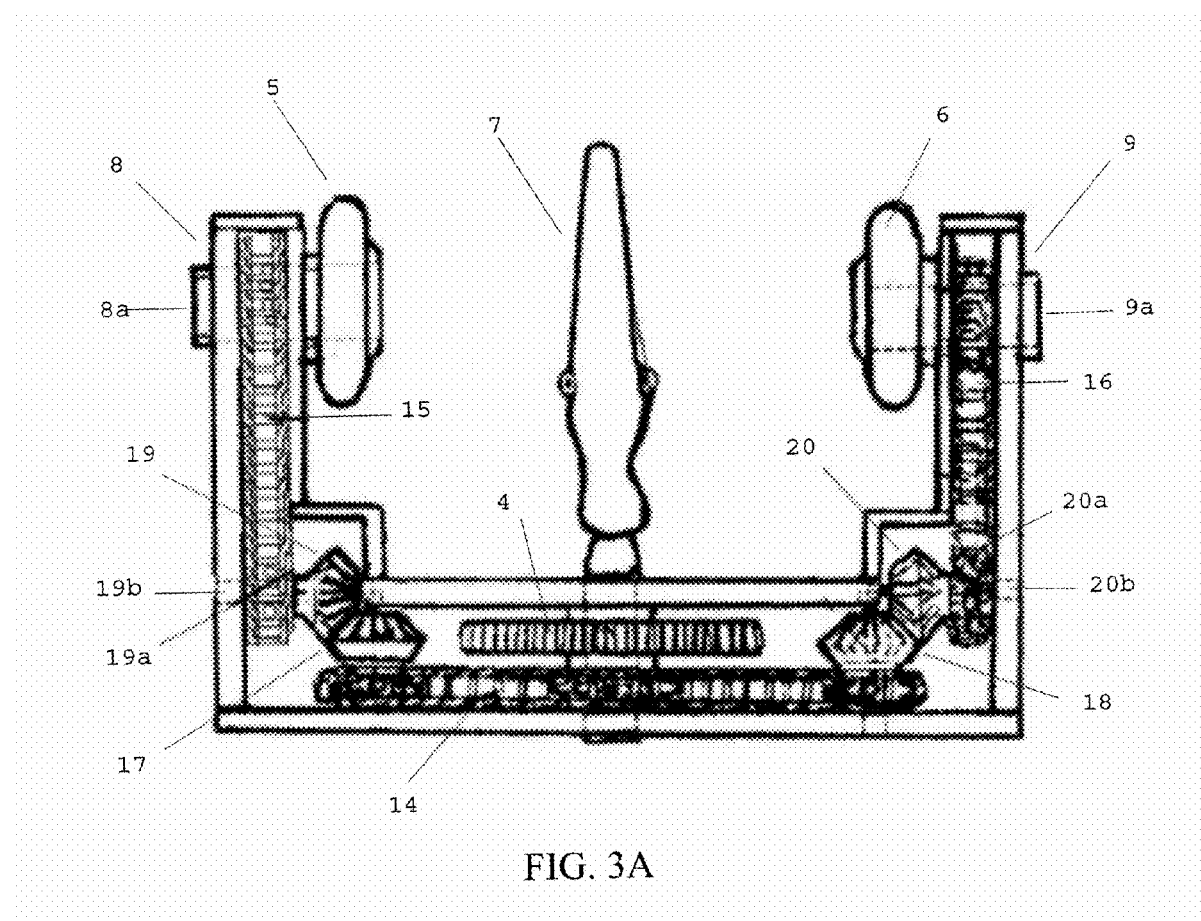
FIG. 3A shows a front view of the internals of the embodiment shown in FIG. 1.
Figure 3B:
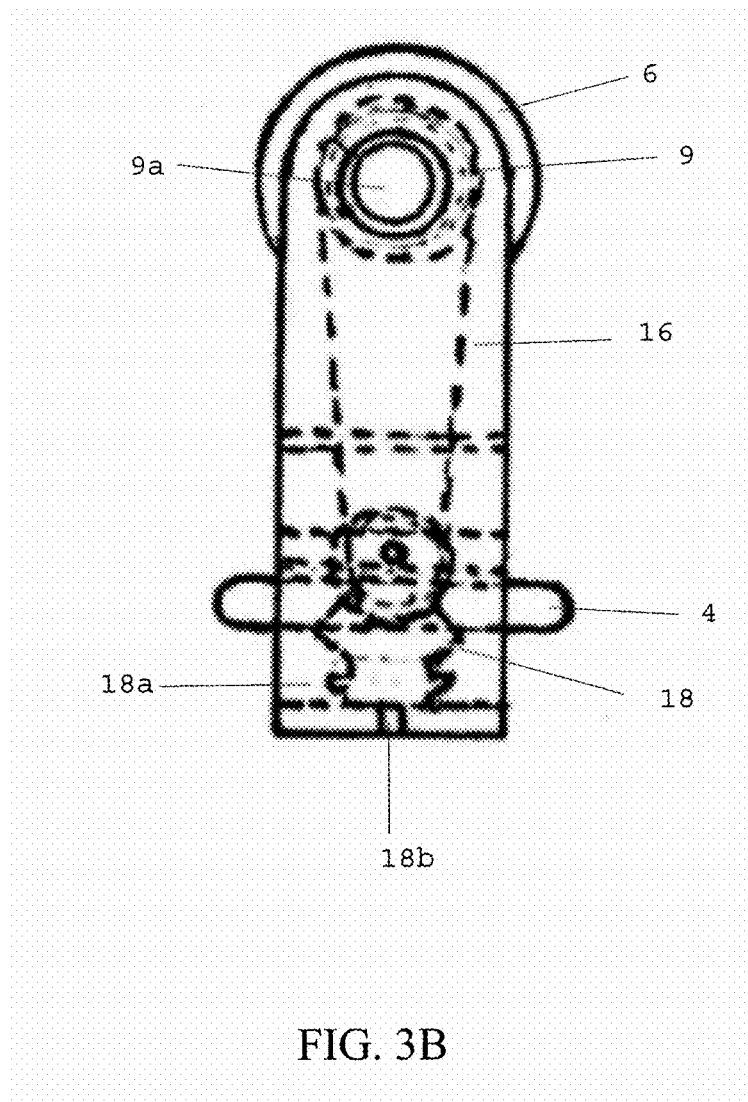
FIG. 3B shows a right side view of the internals of the embodiment shown in FIG. 1.
Figure 3C:
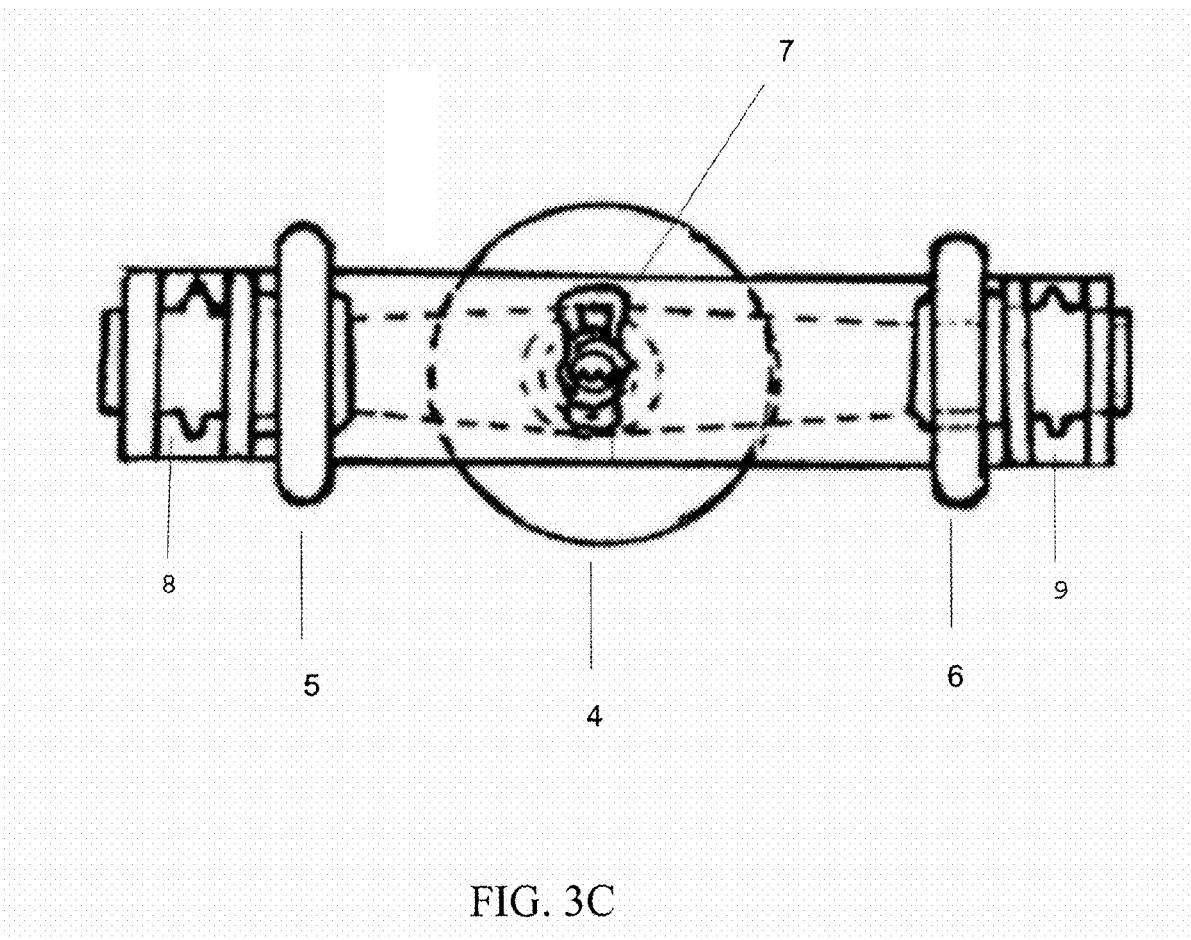
FIG. 3C shows a top view of the internals of the embodiment shown in FIG. 1.
Figure 5A:
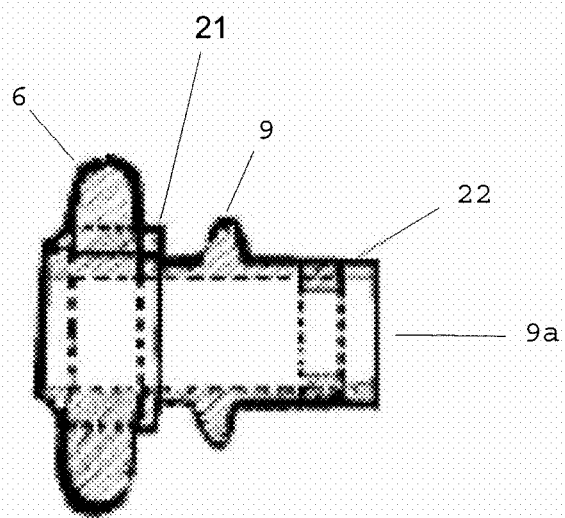
FIG. 5A is a section view of a terminal wheel/sprocket assembly in the embodiment shown in FIG. 1.
Figure 5B:
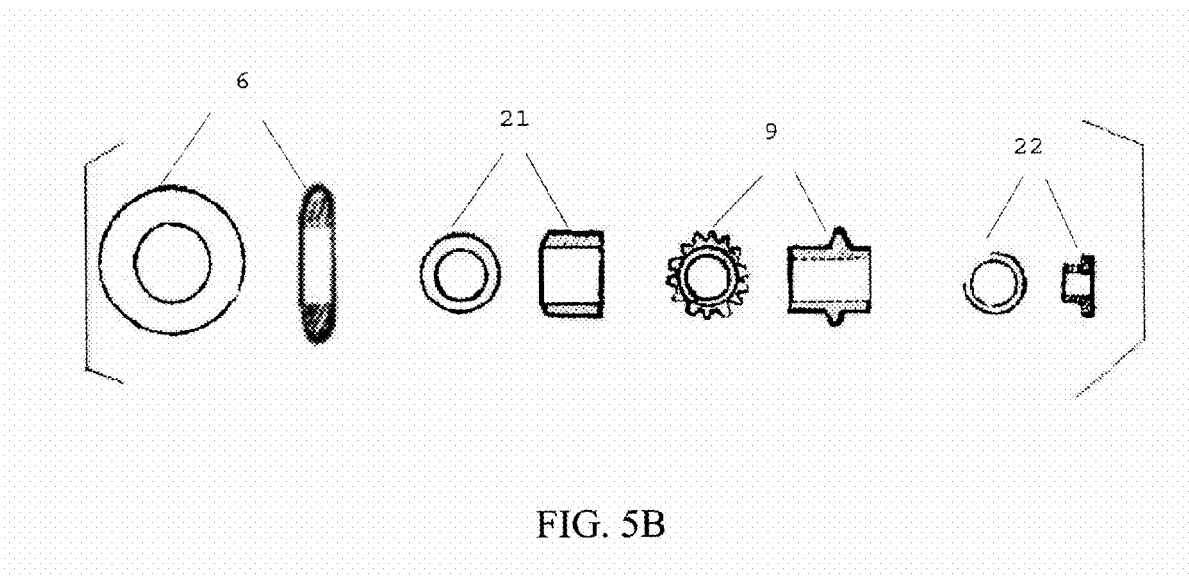
FIG. 5B is an exploded view of the terminal wheel/upper sprocket assembly shown in FIG. 5A, showing front perspective and profile views of each component.
Figure 5C:
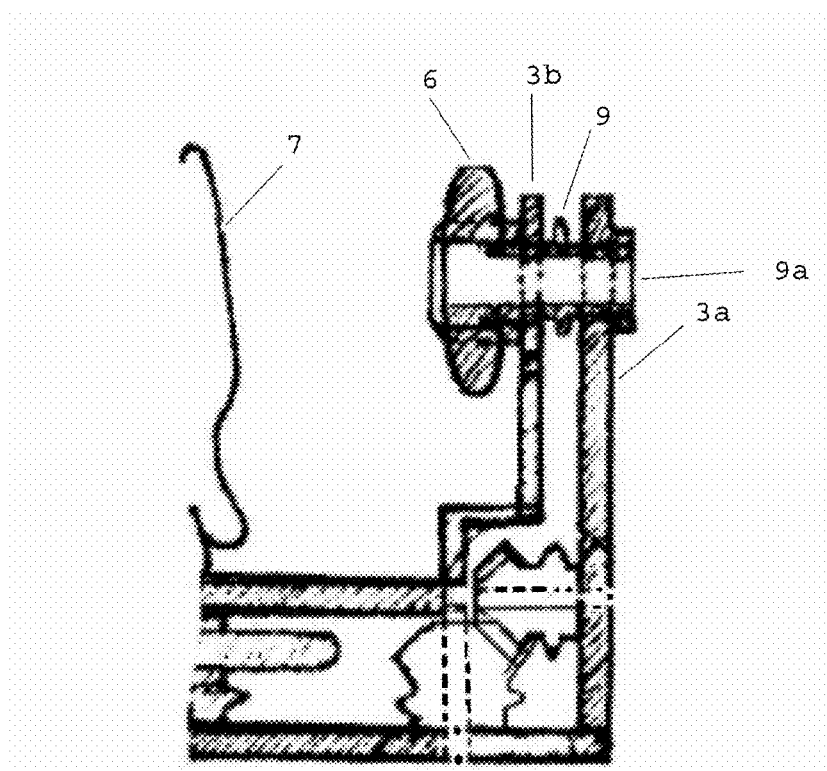
FIG. 5C is a front view of the right lateral elevation of the embodiment shown in FIG. 1 showing the positions of the terminal wheel and upper sprocket.
Figure 5D:
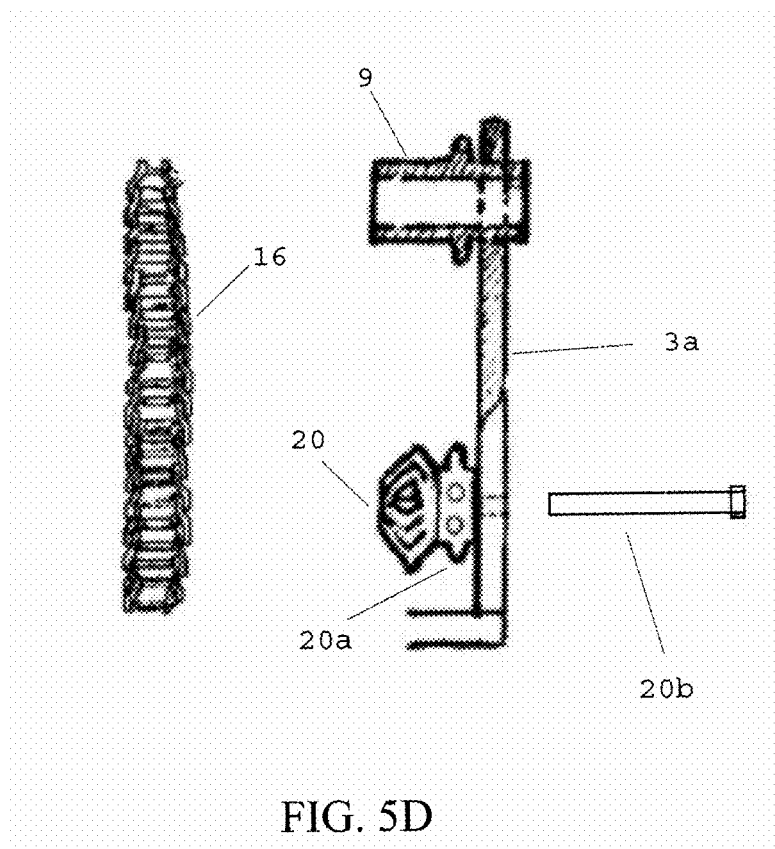
FIG. 5D is an exploded view of the right side gears, sprocket, and roller chain in the right lateral elevation in the embodiment shown in FIG. 1.

Left and right vertical miter gears 19 and 20 are attached at the lower portion of the left and right lateral elevations, respectively (FIG. 3A). Left vertical miter gear 19 is attached to the lower portion of left lateral elevation 2 and is mounted on sprocket 19a such that left vertical miter gear 19 and sprocket 19a rotate at the same rate and in the same direction around axle 19b (FIG. 3A). Similarly, right vertical miter gear 20 is attached to the lower portion of right lateral elevation 3 and is mounted on sprocket 20a such that right vertical miter gear 20 and sprocket 20a rotate at the same rate and in the same direction around axle 20b (FIGS. 3A and 5D).

Figure 3D:
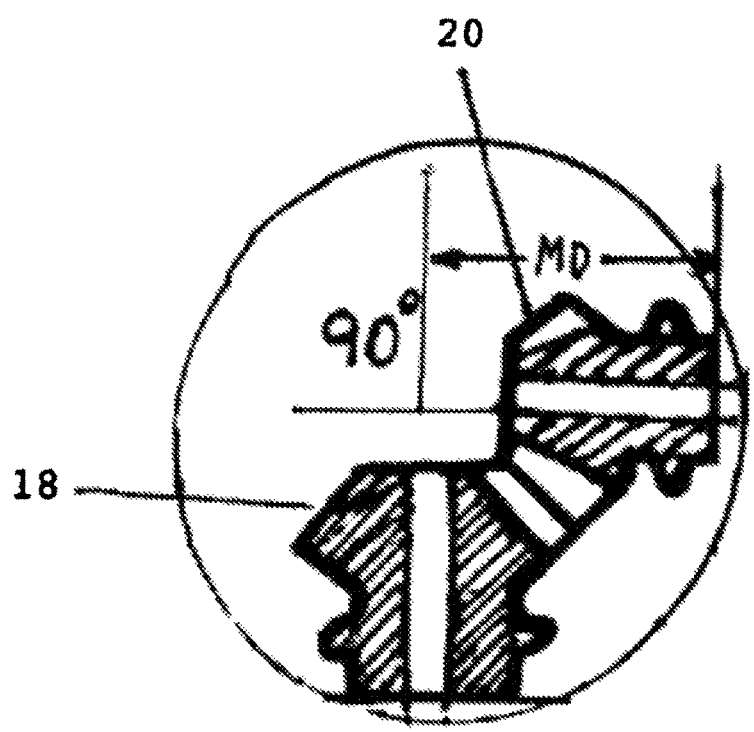
FIG. 3D shows a section view of the miter gears of the embodiment in FIG. 1, wherein the horizontal miter gears are perpendicular to (at 90 degrees to) the vertical miter gears.

Left horizontal miter gear 17 and left vertical miter gear 19 are engaged perpendicular to each other, and right horizontal miter gear 18 and right vertical miter gear 20 are engaged perpendicular to each other (FIGS. 3A, 3D). This arrangement of horizontal and vertical miter gears allows the rotational energy imparted to controller 4 to be transferred to the vertical miter gears, and ultimately to the terminal wheels.

The rotational energy transferred from controller 4 to vertical miter gears 19 and 20 is further transferred to terminal wheels 5 and 6 through left and right lateral elevation roller chains 15 and 16, respectively (FIG. 3A). Left lateral elevation roller chain 15 engages sprocket 19a and left hollow upper sprocket 8. Right lateral elevation roller chain 16 engages sprocket 20a and right hollow upper sprocket 9 (FIG. 3A). Rotation of controller 4 by the user transfers rotational energy through sprocket 4a to center roller chain 14 which rotates left horizontal miter gear 17 causing rotation of left vertical miter gear 19, which in turn causes corresponding rotation of sprocket 19a. The rotation of sprocket 19a drives left lateral elevation roller chain 15 which causes rotation of left hollow upper sprocket 8. Left terminal wheel 5, being attached to left hollow upper sprocket 8, rotates as left hollow upper sprocket 8 rotates. Rotation of controller 4 by the user also transfers rotational energy through sprocket 4a to center roller chain 14 which rotates right horizontal miter gear 18 causing rotation of right vertical miter gear 20, which in turn causes corresponding rotation of sprocket 20a. The rotation of sprocket 20a drives right lateral elevation roller chain 16 which causes rotation of right hollow upper sprocket 9. Right terminal wheel 6, being attached to right upper sprocket 9, rotates as right hollow upper sprocket 9 rotates.

Terminal wheels 5 and 6 are attached to left and right hollow upper sprockets 8 and 9, respectively, by means of internal and external lockets. Terminal wheel 6, for example, is attached to right hollow upper sprocket 9 by internal locket 21 and external locket 22. (FIGS. 5A and 5B). It will be appreciated that the terminal wheels, hollow upper sprockets, and internal and external lockets have hollow cores. The terminal wheel and sprocket assemblies (see, e.g., FIG. 5A) therefore also have a hollow core. In the assembled knot-tying device, these hollow cores create a right side aperture, 9a, extending from the outside of the right lateral elevation through the inside of the lateral elevation and through the right terminal wheel, through which the line or lines to be knotted may be passed (FIG. 5C). It will be appreciated that a left side aperture, analogous to the right side aperture 9a shown in FIG. 5C with respect to the right lateral elevation, is present in the terminal wheel/hollow upper sprocket assembly on the left lateral elevation (see left side aperture 8a in FIG. 3A). The presence of right side and left side apertures passing from the outside of the device through the terminal wheels is a feature of all embodiments of the present invention.

It should be noted that a feature of the embodiment of FIG. 1 of the present invention is that terminal wheels 5 and 6 rotate at equal speeds, but in opposite direction (when viewed from the same side of the device).

Clip 7 in the embodiment of the present invention shown in FIG. 1 is a simple alligator clip. In other embodiments of the present invention, the clip may take other forms or may comprise two or more separate clips. The essential aspects of the clip are that it is: (1) capable of securely holding the one or more lines to be joined by a knot; and (2) positioned on the device between the two terminal wheels.

Figure 7:
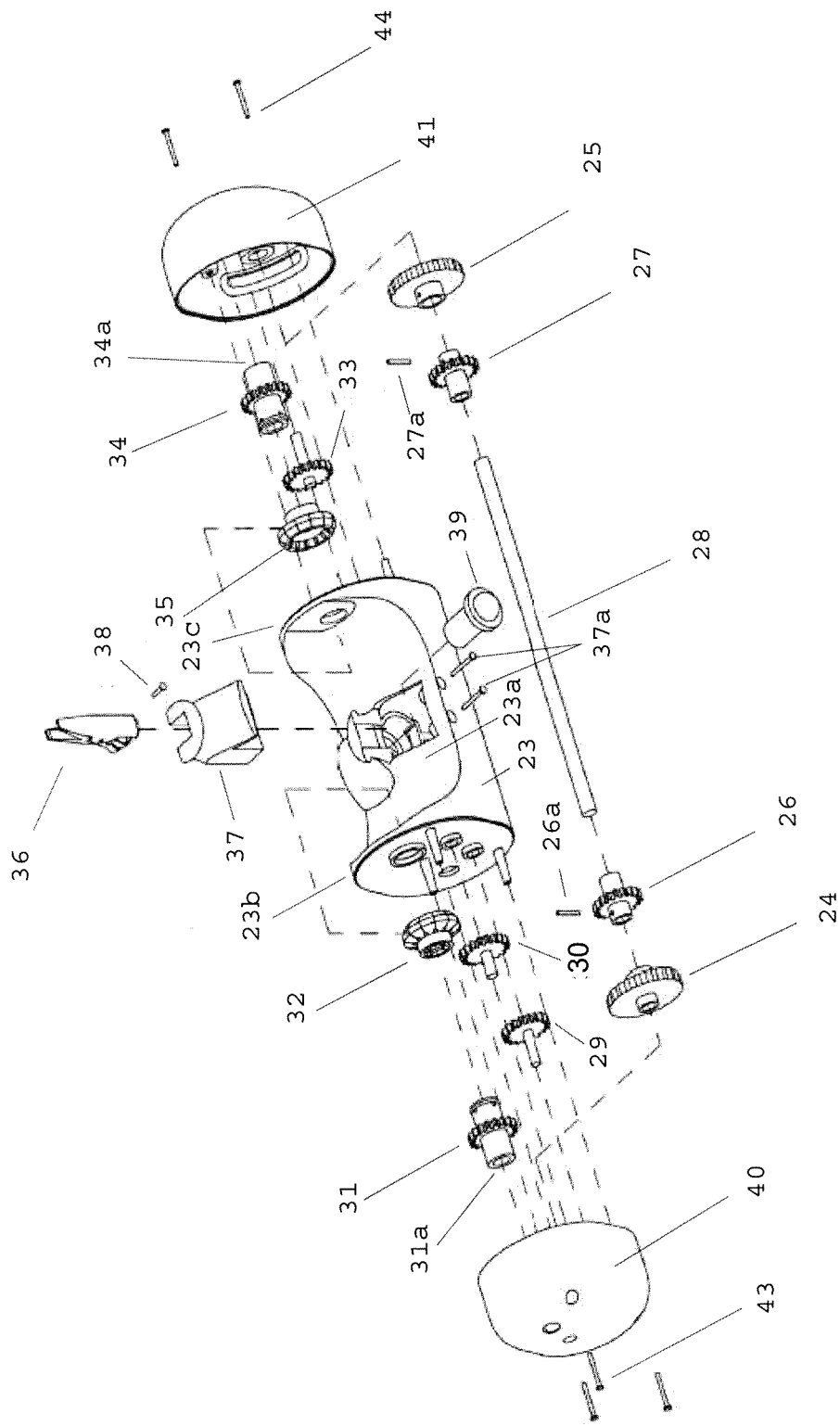
FIG. 7 is an exploded view of a second embodiment of the present invention.

A second embodiment of the present invention is described in reference to FIG. 7. As shown in FIG. 7, this embodiment of the present invention comprises body 23, left controller 24, right controller 25, left pinion gear 26, right pinion gear 27, and axle 28. As shown in FIG. 7, body 23 is contoured such that it comprises a substantially flat, horizontal center portion (23a) with left (23b) and right (23c) sides that elevate in a direction perpendicular to the flat horizontal center portion. Thus, body 23 is generally shaped like a cylinder from which a scoop has been removed.

Axle 28 extends through the interior of body 23 such that the left and right ends of axle 28 protrude from the left and right sides, respectively, of body 23. The left end of axle 28, which protrudes from the left side of body 23, extends through the center of left pinion gear 26 and then attaches to left controller 24. The right end of axle 28, which protrudes from the right side of body 23, extends through the center of right pinion gear 27 and then attaches to right controller 25. Controllers 24 and 25, and pinion gears 26 and 27 are fixed to axle 28 with pins 26a and 27a, respectively, such that rotation of axle 28 about its longitudinal axis results in rotation of the controllers (24 and 25) and the pinion gears (26 and 27). In this embodiment, the user imparts rotational energy to axle 28 by rotating left controller 24, right controller 25, or both controllers (24 and 25). Rotation of axle 28 causes corresponding rotation of left and right pinion gears 26 and 27.

In the embodiment shown in FIG. 7, left pinion gear 26 engages left inner spur gear 29. Left inner spur gear 29 engages left inner spur gear 30. Left inner spur gear 30 engages left upper spur gear 31 (FIG. 7). Left upper spur gear 31 is attached to left terminal wheel 32. Rotation of left pinion gear 26 (as caused by rotation of axle 28) causes rotation of left inner spur gear 29, which causes rotation of left inner spur gear 30, which causes rotation of left upper spur gear 31, which causes rotation of left terminal wheel 32. Thus, the rotational energy of axle 28 is transferred through the series of spur gears 29, 30, and 31 to cause rotation of terminal wheel 32.

In the embodiment shown in FIG. 7, right pinion gear 27 engages right inner spur gear 33. Right inner spur gear 33 engages right upper spur gear 34 (FIG. 7). Right upper spur gear 34 is attached to right terminal wheel 35. Rotation of right pinion gear 27 (as caused by rotation of axle 28) causes rotation of right inner spur gear 33, which causes rotation of right upper spur gear 34, which causes rotation of right terminal wheel 35. Thus, the rotational energy of axle 28 is transferred through the series of spur gears 33 and 34 to cause rotation of terminal wheel 35.

In this embodiment of the present invention, left upper spur gear 31 is attached to left terminal wheel 32, and right upper spur gear 34 is attached to right terminal wheel 35. Each of parts 31, 32, 34, and 35 has a hollow core, such that the mounting of left terminal wheel 32 onto left upper spur gear 31 creates a left side aperture (31a) that extends from outside the left side of the body through the left terminal wheel 32 and the mounting of right terminal wheel 35 onto right upper spur gear 34 creates a right side aperture (34a) that extends from outside the right side of the body through the right terminal wheel 35.

It will be appreciated that the configuration of spur gears on the left side of the embodiment shown in FIG. 7 differs from the configuration of spur gears on the right side of the embodiment in that the configuration on the left side includes three spur gears (29, 30, and 31) while the configuration on the right side includes only two spur gears (33 and 34) (See FIG. 7). This difference makes the rotation of the terminal wheels proceed in opposite directions (as viewed from the same side of the device). It will be appreciated further that the choice of which side of the device (i.e., left or right) is to have three spur gears and which is to have two spur gears is arbitrary. Moreover, it will be appreciated more generally that different embodiments of the device of the present invention may have a different numbers of spur gears, provided that one side has an even number of spur gears, and the other side has an odd number of spur gears.

The left-side and right-side gear configurations of the embodiment shown in FIG. 7 have gear ratios such that the rotational speed of the left terminal wheel 32 is the same as that of right terminal wheel 35 (although, as discussed previously, rotation is in opposite directions).

The gear arrangement of the present invention is designed to produce synchronized rotational motion of the terminal wheels in opposite directions. This gear arrangement is shown more generally in FIGS. 8A and 8B. Axle 45 has pinion gears 46 and 47 attached at either end. Pinion gear 46 engages spur gear 48. Spur gear 48 engages upper spur gear 49. On the other end of axle 45, pinion gear 47 engages spur gear 50. Spur gear 50 engages spur gear 51. Spur gear 51 engages upper spur gear 52. When viewed from the same side of the device, clockwise rotation of axle 45 causes clockwise rotation of pinion gear 46. Clockwise rotation of pinion gear 46 causes counter-clockwise rotation of spur gear 48. Counterclockwise rotation of spur gear 48 causes clockwise rotation of upper spur gear 49. Because upper spur gear 49 is attached to terminal wheel 53, terminal wheel 53 undergoes clockwise rotation. Clockwise rotation of pinion gear 47 causes counter-clockwise rotation of spur gear 50. Counter-clockwise rotation of spur gear 50 causes clockwise rotation of spur gear 51. Clockwise rotation of spur gear 51 causes counter-clockwise rotation of upper spur gear 52. Because upper spur gear 52 is attached to terminal wheel 54, terminal wheel 54 undergoes counter-clockwise rotation. As viewed from the same perspective therefore, terminal wheels 53 and 54 rotate in opposite directions.

Moreover, in the present invention the gear ratios are arranged so that the rotational speeds of terminal wheels 53 and 54 are equal.

As is evident from FIG. 7, one uses the embodiment shown in FIG. 7 by imparting rotational energy to either or both of left and right controllers 24 and 25, thereby causing rotation of axle 28, and thereby rotation of left and right pinion gears 26 and 27. The rotational energy of left pinion gear 26 is transferred through left spur gears 29, 30, and 31 to result in rotation of left terminal wheel 32. The rotational energy of right pinion gear 27 is transferred through right spur gears 33 and 34 to result in rotation of right terminal wheel 35. Thus, left and right terminal wheels 32 and 35 rotate at the same speed in opposite directions (as viewed from the same side of the device), wherein the rotational speed is proportional to the rotational energy imparted to the controller(s) by the user.

The embodiment shown in FIG. 7 also includes a clip 36 attached to body 23 at a position centered between left and right terminal wheels 32 and 35. Clip 36 is attached to body 23 by clip holder 37 and clip fastener 38. Clip 36 is opened and closed by pressing or releasing clip button 39. Clip holder 37 is fixed to body 23 by fasteners 37a.

The gear mechanisms in the embodiment shown in FIG. 7 are covered by left cap 40 and right cap 41, which are held in place by fasteners 43 and 44, respectively. Left cap 40 attaches to and supports rotation of left controller 24, left inner spur gears 29 and 30, and left upper spur gear 31. Left cap 40 also comprises a slot that exposes a portion of left controller 24 so that it can be rotated by a user. Left cap 40 also comprises an opening that extends into and aligns with left side aperture 31a, such that left side aperture 31a extends from the outside of the device through left terminal wheel 32. Right cap 41 attaches to and supports rotation of right controller 25, right inner spur gear 33, and right upper spur gear 34. Right cap 41 also comprises a slot that exposes a portion of right controller 25 so that it can be rotated by a user. Right cap 41 also comprises an opening that extends into and aligns with aperture 34a, such that aperture 34a extends from the outside of the device through right terminal wheel 35. As is evident from FIG. 7, axle 28 and gears 26, 27, 29, 30, 31, 33 and 34 in this embodiment of the invention are attached to body 23, left cap 40, and/or right cap 41 in a manner that supports the gears and permits their rotation.

Figure 9:
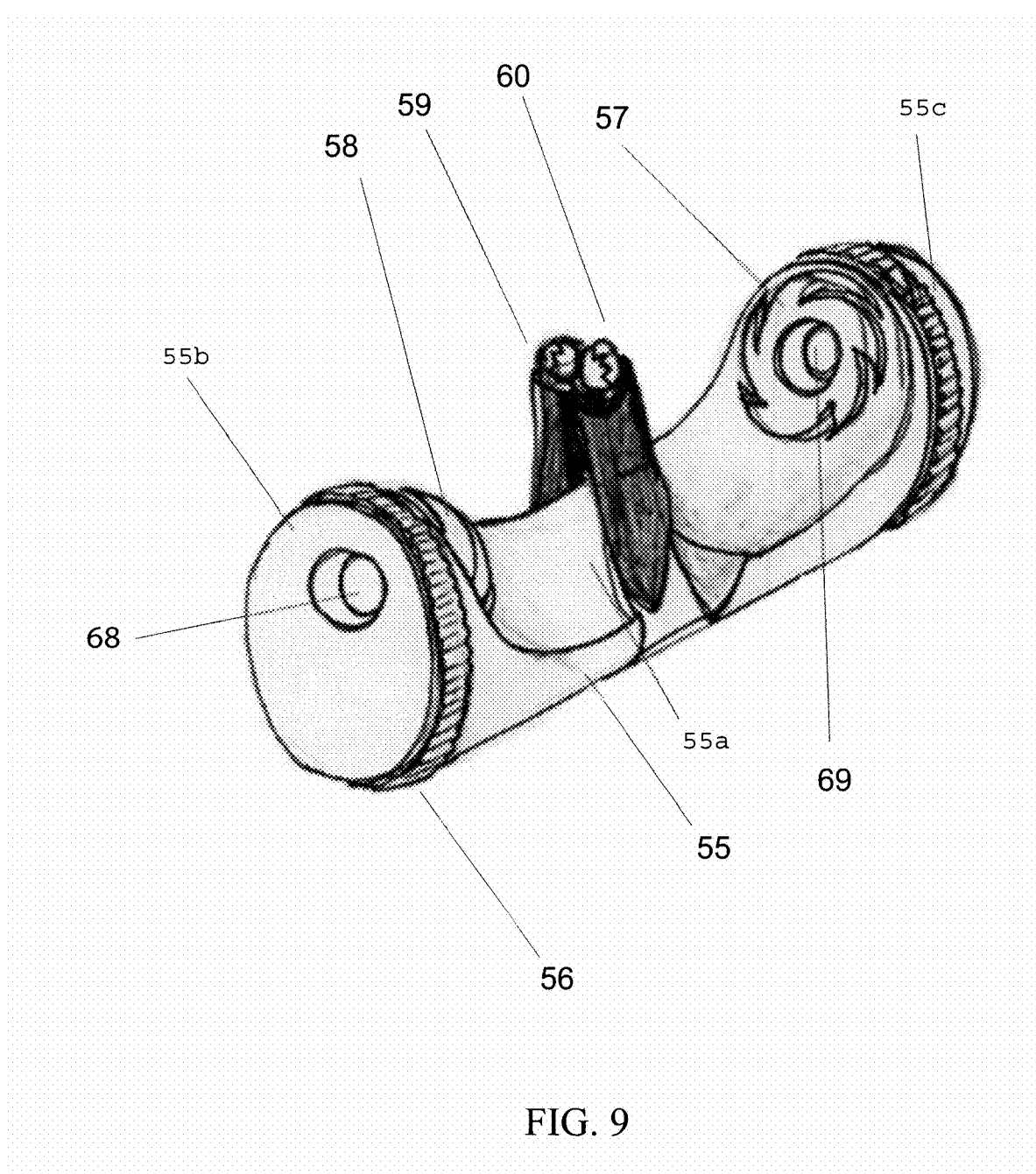
FIG. 9 is a perspective of a third embodiment of the present invention.

A third embodiment of the present invention is described in reference to FIGS. 9, 10A-C, 11, 12, 13, and 14A-C. As shown in FIG. 9, this embodiment of the present invention comprises body 55, controller 56, right terminal wheel 57, left terminal wheel 58, and clips 59 and 60. As shown in FIG. 9, body 55 is contoured such that it comprises a substantially flat, horizontal center portion (55a) with left (55b) and right (55c) sides that elevate in a direction perpendicular to the flat horizontal center portion. Thus, body 55 is generally shaped like a cylinder from which a scoop has been removed.

Controller 56 is a circular gear that has an outer surface that may be contoured. The outer surface is exposed on the outside of the device and is contacted by the user during operation of the device. Controller 56 also has an inner surface that is toothed, wherein the teeth engage and drive gears in the interior of the device. Controller 56 is fitted into a slot in the body of the device, wherein the slot allows the controller to be turned about the longitudinal axis of the device.

Figure 10A:
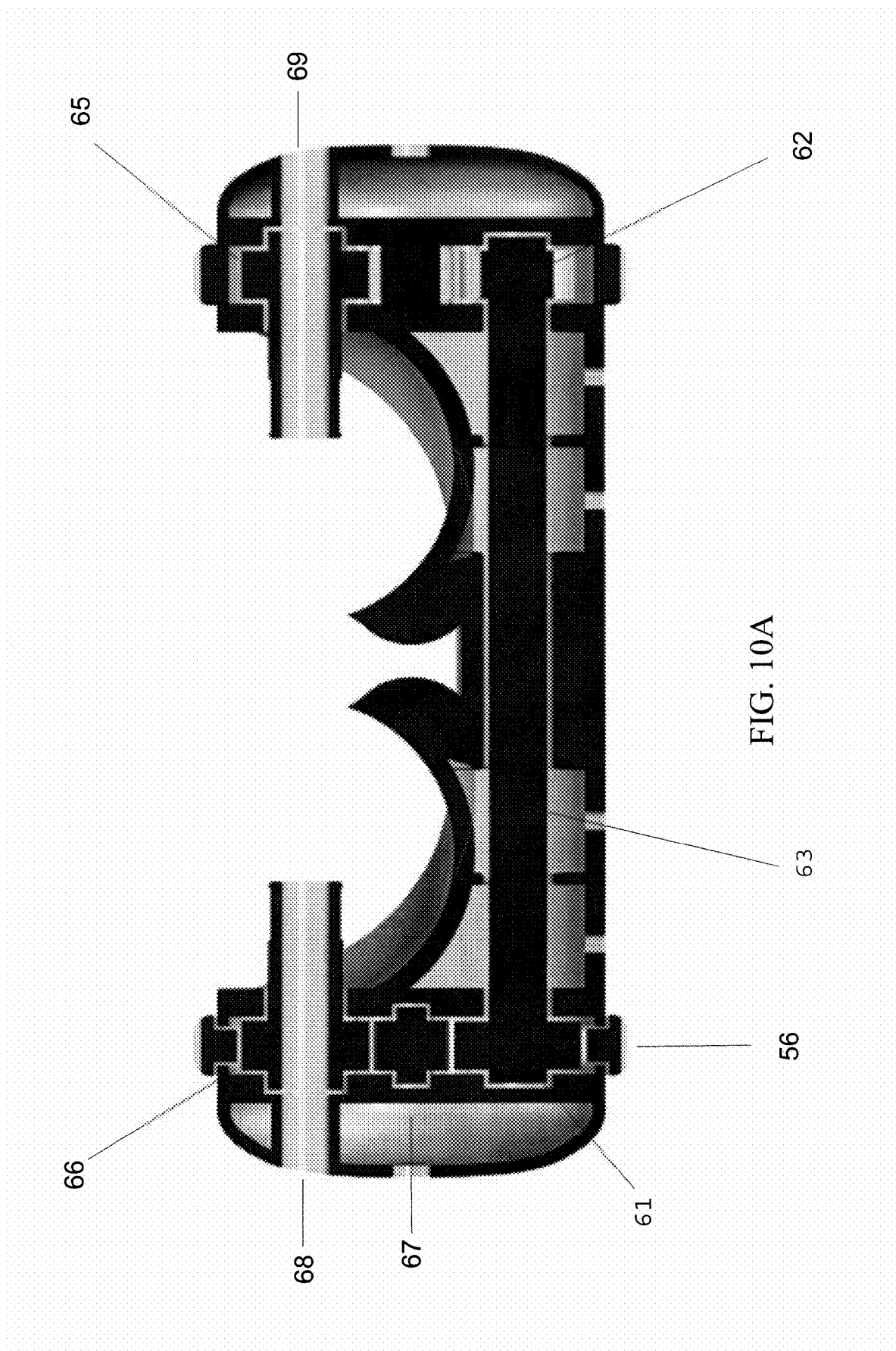
FIG. 10A is a longitudinal cross section of the body of the embodiment shown in FIG. 9.
Figure 10B:
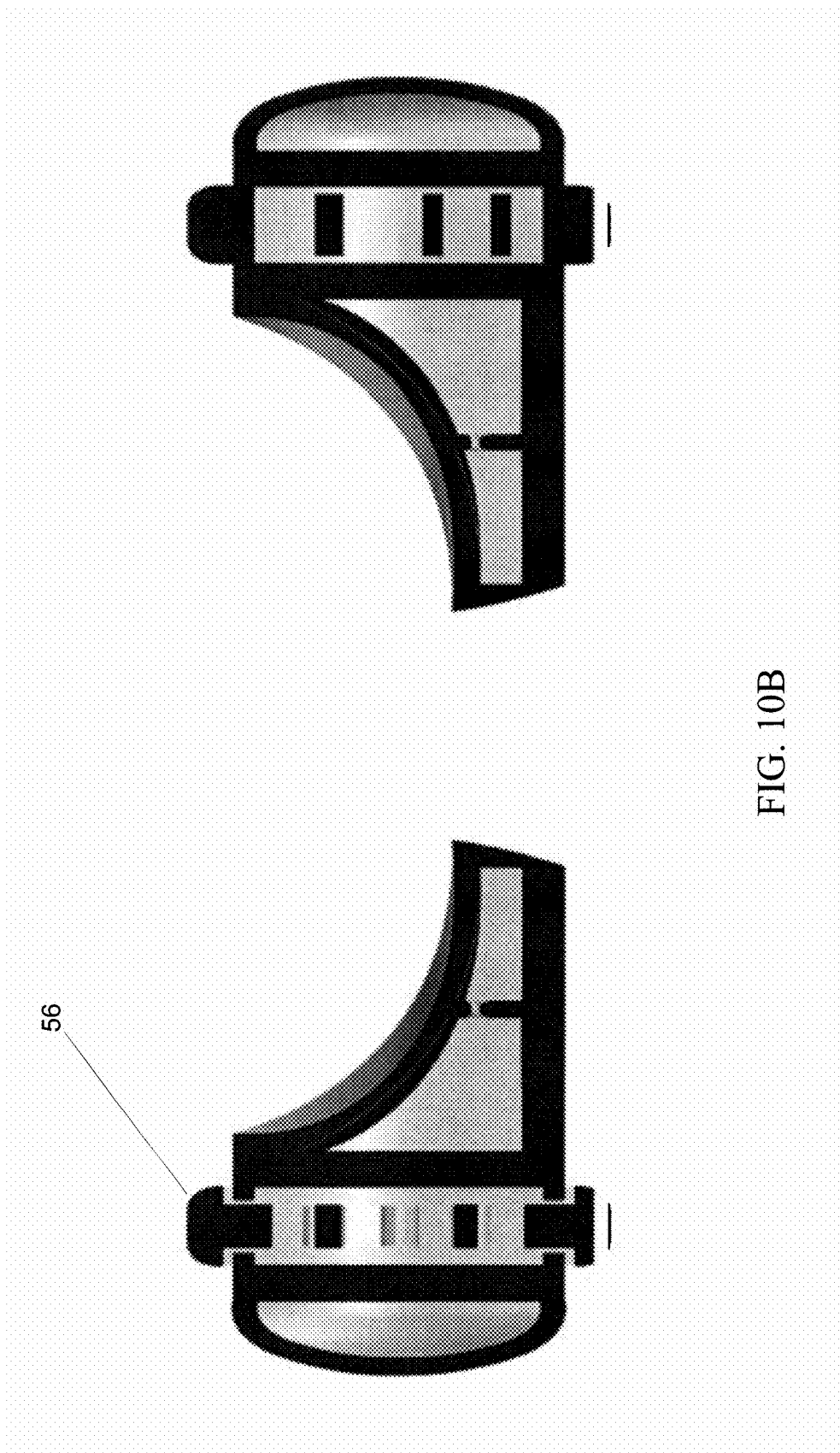
FIG. 10B is a longitudinal cross section of the body of the embodiment shown in FIG. 9.
Figure 10C:
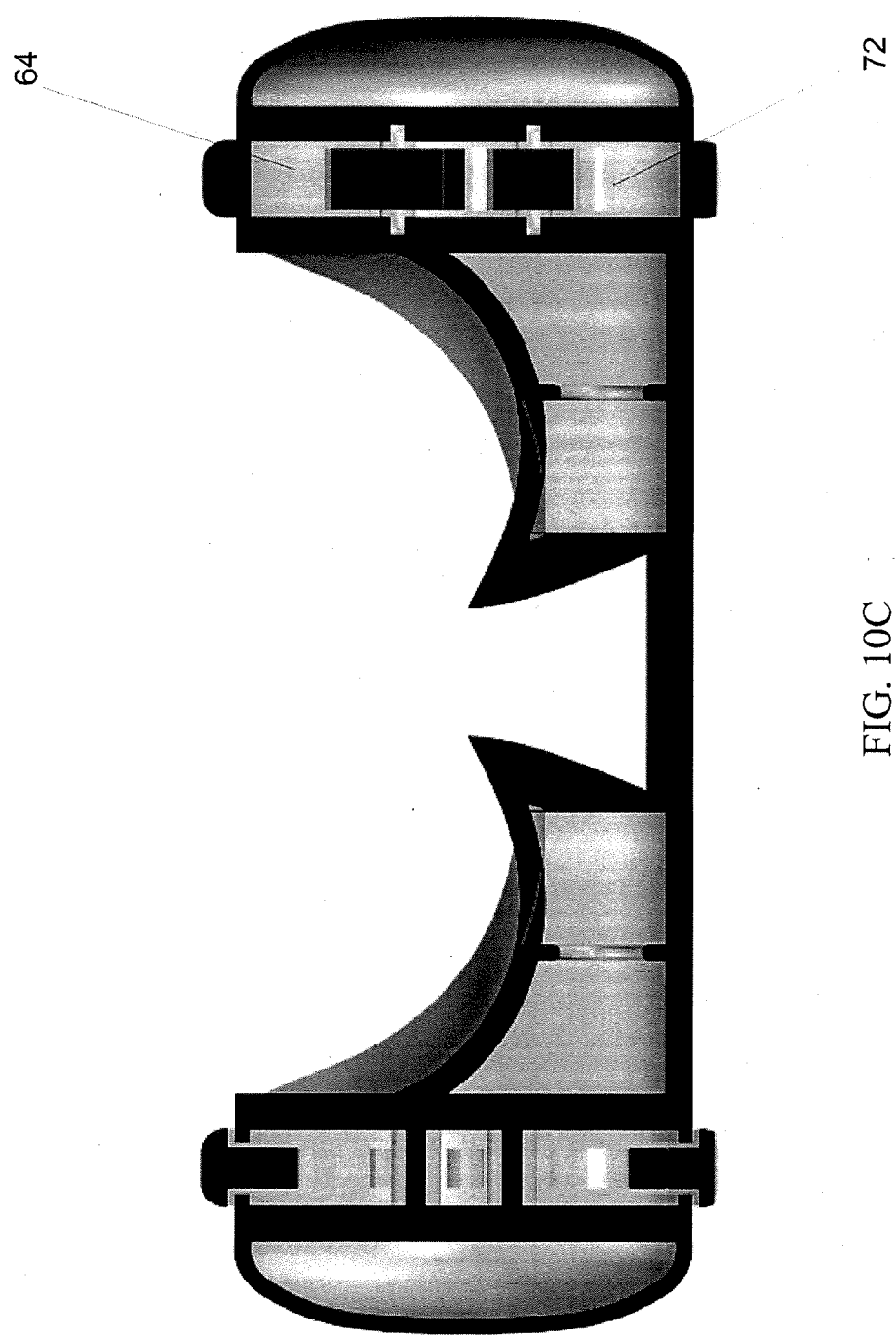
FIG. 10C is a longitudinal cross section of the body of the embodiment shown in FIG. 9.
Figure 11:
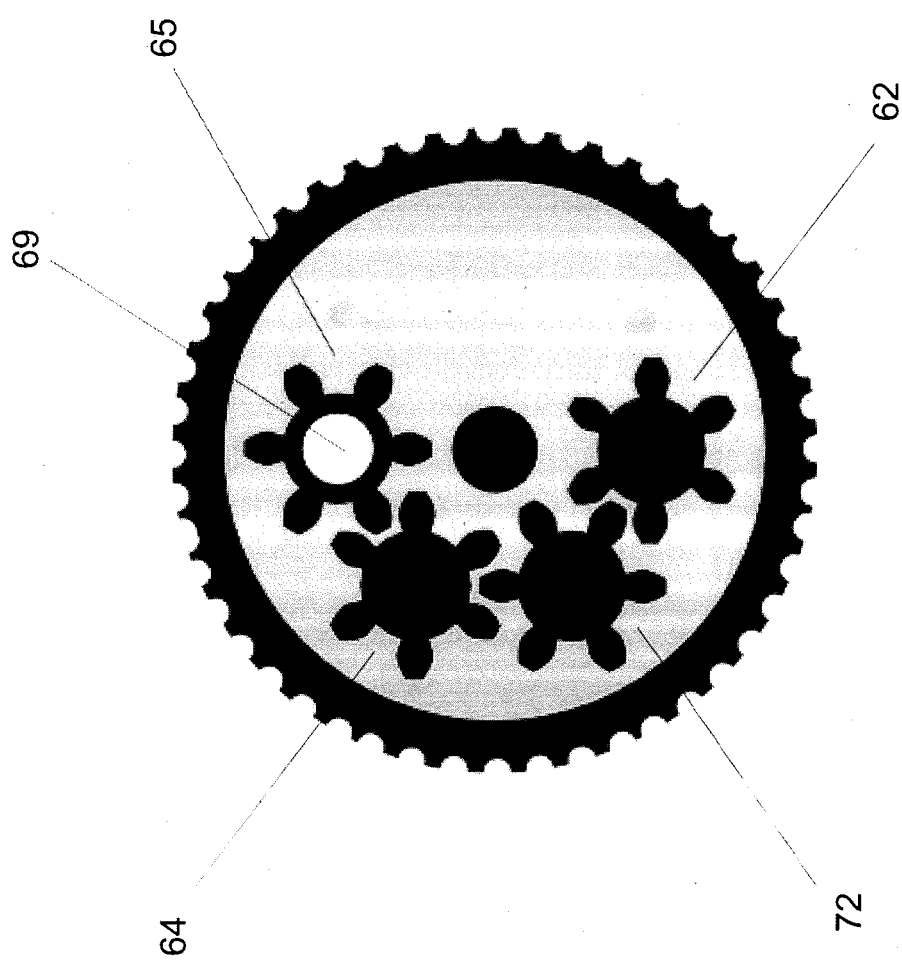
FIG. 11 is a sectional view of the right side of the embodiment shown in FIG. 9.
Figure 12:
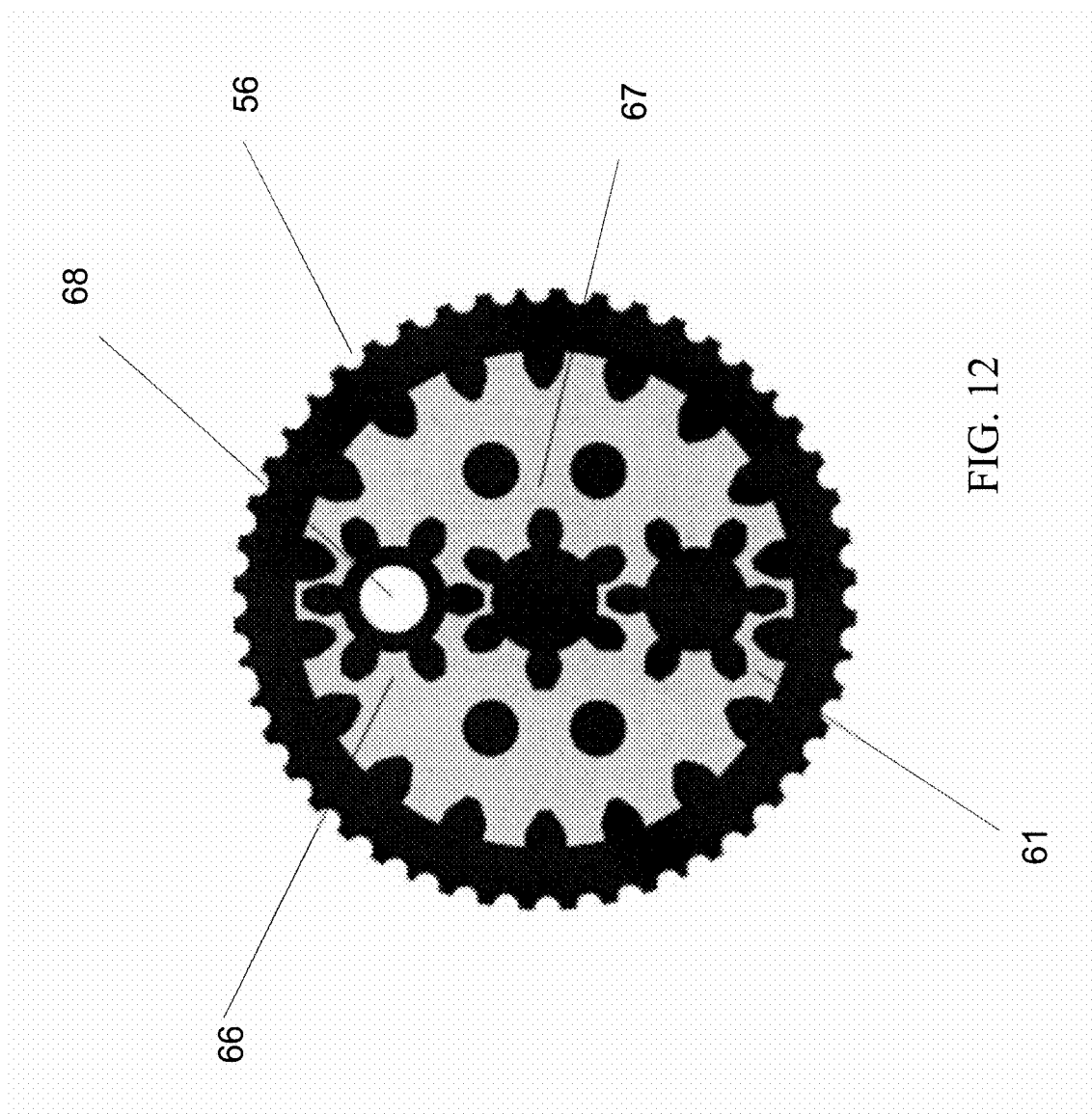
FIG. 12 is a sectional view of the left side of the embodiment shown in FIG. 9, showing gears and the controller.
Figure 13:
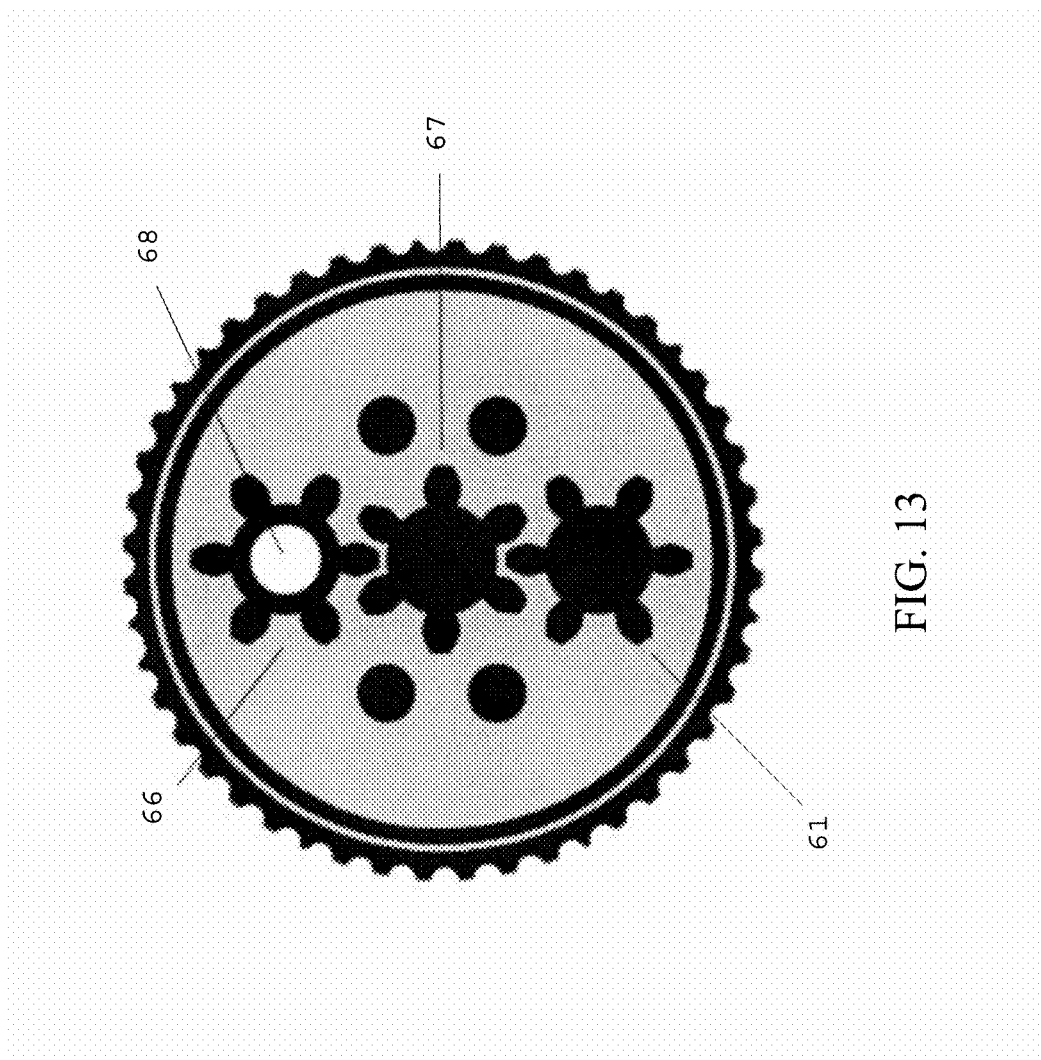
FIG. 13 is a sectional view of the left side of the embodiment shown in FIG. 9, showing only gears.
Figure 14A:
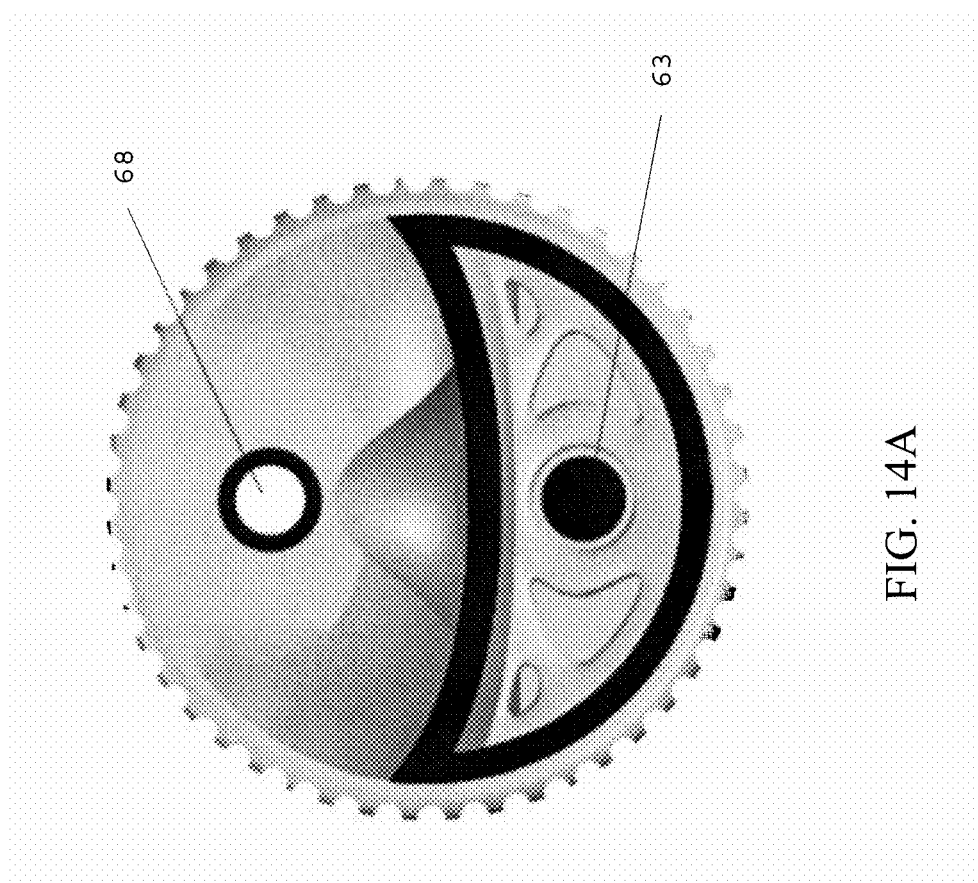
FIG. 14A is a sectional view of the left side of the embodiment shown in FIG. 9.
Figure 14B:
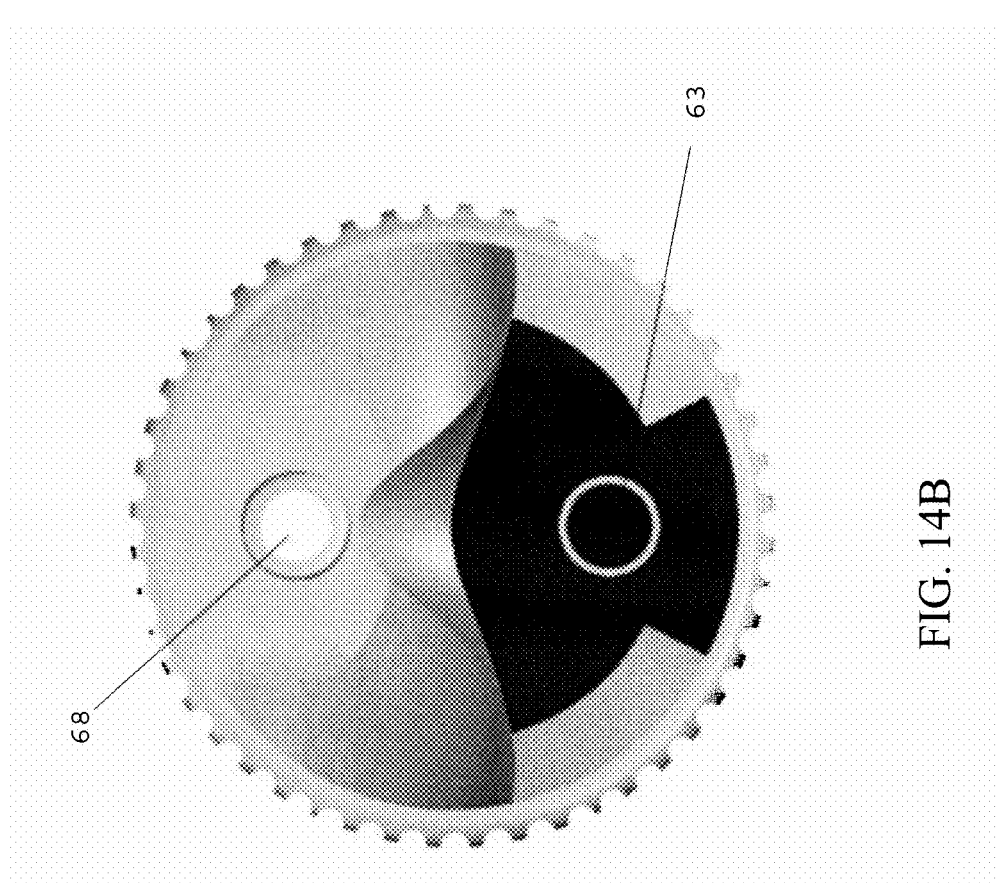
FIG. 14B is a sectional view of the left side of the embodiment shown in FIG. 9.
Figure 14C:
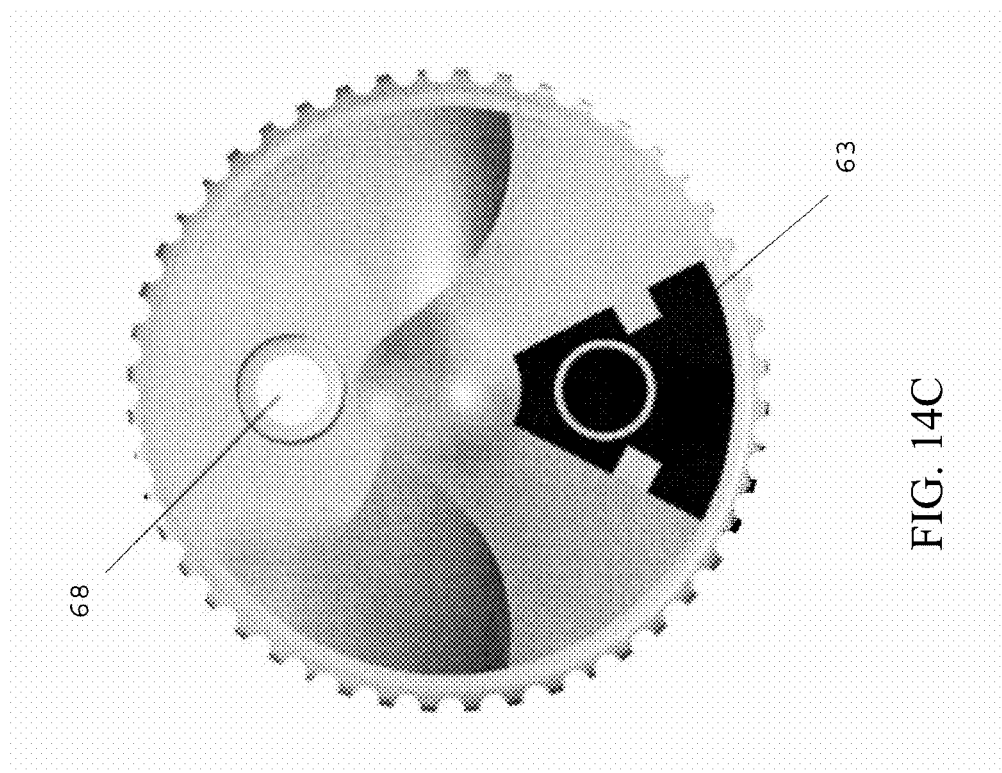
FIG. 14C is a sectional view of the left side of the embodiment shown in FIG. 9.

In the embodiment in FIG. 9, left pinion gear 61 is connected to right pinion gear 62 by axle 63, such that rotation of axle 63 about its longitudinal axis causes simultaneous rotation of left and right pinion gears 61 and 62, respectively (FIG. 10A). Right pinion gear 62 engages right spur gear 72 (FIGS. 10C and 11). Right spur gear 72 engages right spur gear 64 (FIGS. 10C and 11). Right spur gear 64 engages right upper spur gear 65 (FIGS. 10A and 11). Right upper spur gear 65 attaches to right terminal wheel 57 (FIG. 9) such that rotation of right upper spur gear 65 results in rotation of right terminal wheel 57. In the embodiment of FIG. 9, controller 56 is itself a gear that engages left pinion gear 61 and left upper spur gear 66 such that clockwise rotation of controller 56 causes simultaneous clockwise rotation of left pinion gear 61 and of left upper spur gear 66 (FIG. 12). Left spur gear 67 also engages left pinion gear 61 and left upper spur gear 66, and assists in supporting rotation of left pinion gear 61 and left upper spur gear 66 (FIG. 12). Left upper spur gear 66 attaches to left terminal wheel 58 (FIG. 9) such that rotation of left upper spur gear 66 results in rotation of left terminal wheel 58. It will be appreciated that the axle and gears in this embodiment of the present invention are attached to the body by means that permit the rotation of those gears. As is evident from FIGS. 10A and 10C, axle 63 and gears 61, 67, 66, 62, 72, 64, 65, in this embodiment of the invention are attached to body 55 in a manner that supports the axles and gears and permits their rotation.

The left-side and right-side gear configurations of the embodiment referred to in FIGS. 9-14C have gear ratios such that the rotational speed of left upper spur gear 66 (and hence left terminal wheel 58) is the same as that of right upper spur gear 65 (and hence right terminal wheel 57), although, as discussed previously, rotation is in opposite directions when viewed from the same face of the device.

The embodiment shown in FIGS. 9-14C, like all embodiments of the present invention, includes, on either side of the device, an aperture extending from the outside of the device, through the upper spur gear, and through the center of the terminal wheel (see left side aperture 68 and right side aperture 69, FIGS. 9-14C). The one or more lines to be entwined are fed through these apertures from the outside of the device.

The embodiment of the present invention shown in FIG. 9 has two clips, which happen to be alligator clips. When two lines are to be knotted, the presence of two clips allows each of the two lines to be knotted to be individually clipped, thereby making the device easier to use than a device having a single clip. It will be appreciated that other embodiments of the present invention may also have multiple clips attached to the body and centered between the terminal wheels.

Figure 15:
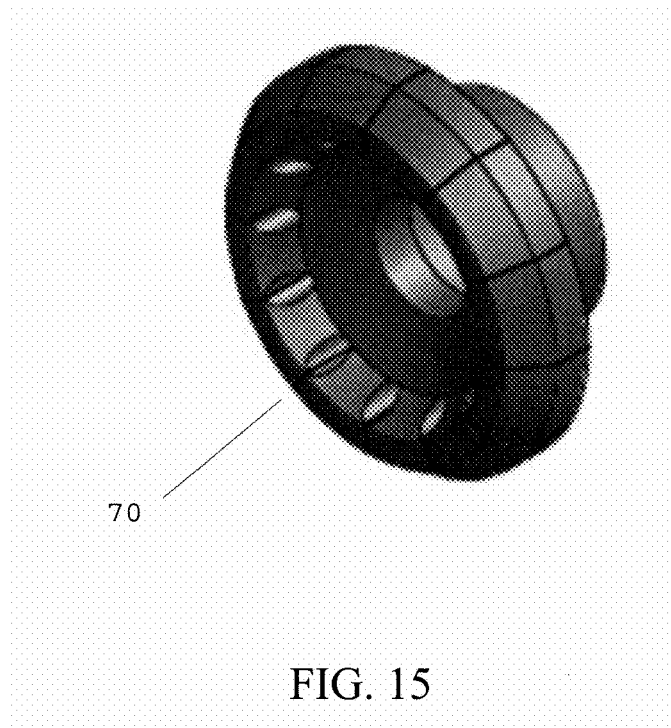
FIG. 15 is a perspective of the terminal wheel of the embodiment shown in FIG. 7.

The terminal wheels in every embodiment of the present invention must be capable of securely holding the one or more lines to be entwined and knotted. A number of terminal wheel designs are able to accomplish this function. In one embodiment, the terminal wheel has one or more slots 70 cut into the terminal wheel extending in a straight radial line from the perimeter of the terminal wheel and extending toward the center of the terminal wheel (FIG. 15). The slots may all be of the same width, or may have different widths to accommodate different line thicknesses. These terminal wheels are used by pushing the line into the slot from the perimeter of the terminal wheel toward the center of the terminal wheel. The line is secured by friction between the surface of the line and the walls of the slot. This type of terminal wheel is exemplified by terminal wheels 32 and 35 in the embodiment shown in FIG. 7.

Figure 8A:
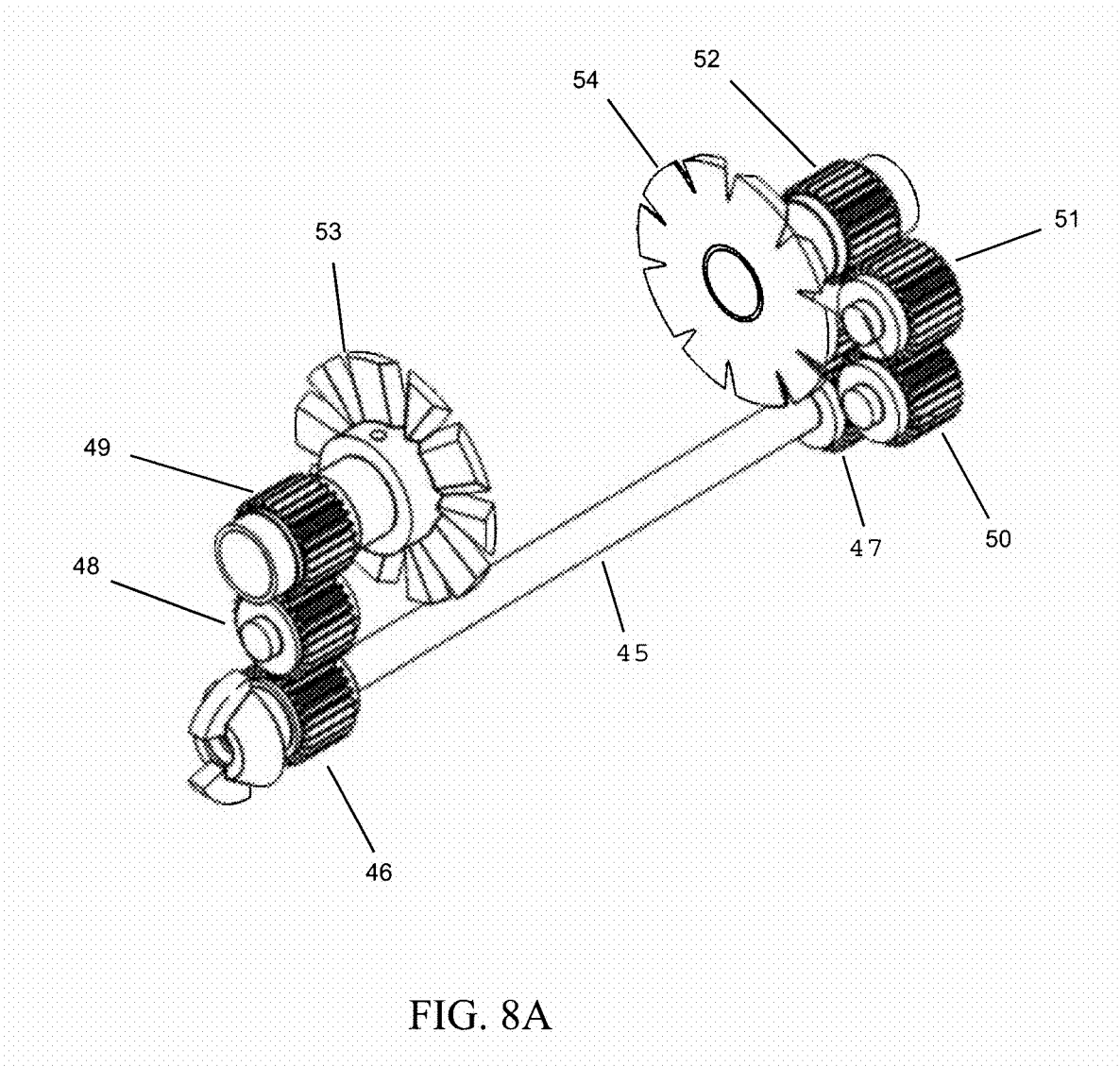
FIG. 8A is a left-side perspective view of the general gear and axle arrangement found in certain embodiments of the present invention, such as the embodiment shown in FIG. 7.
Figure 8B:
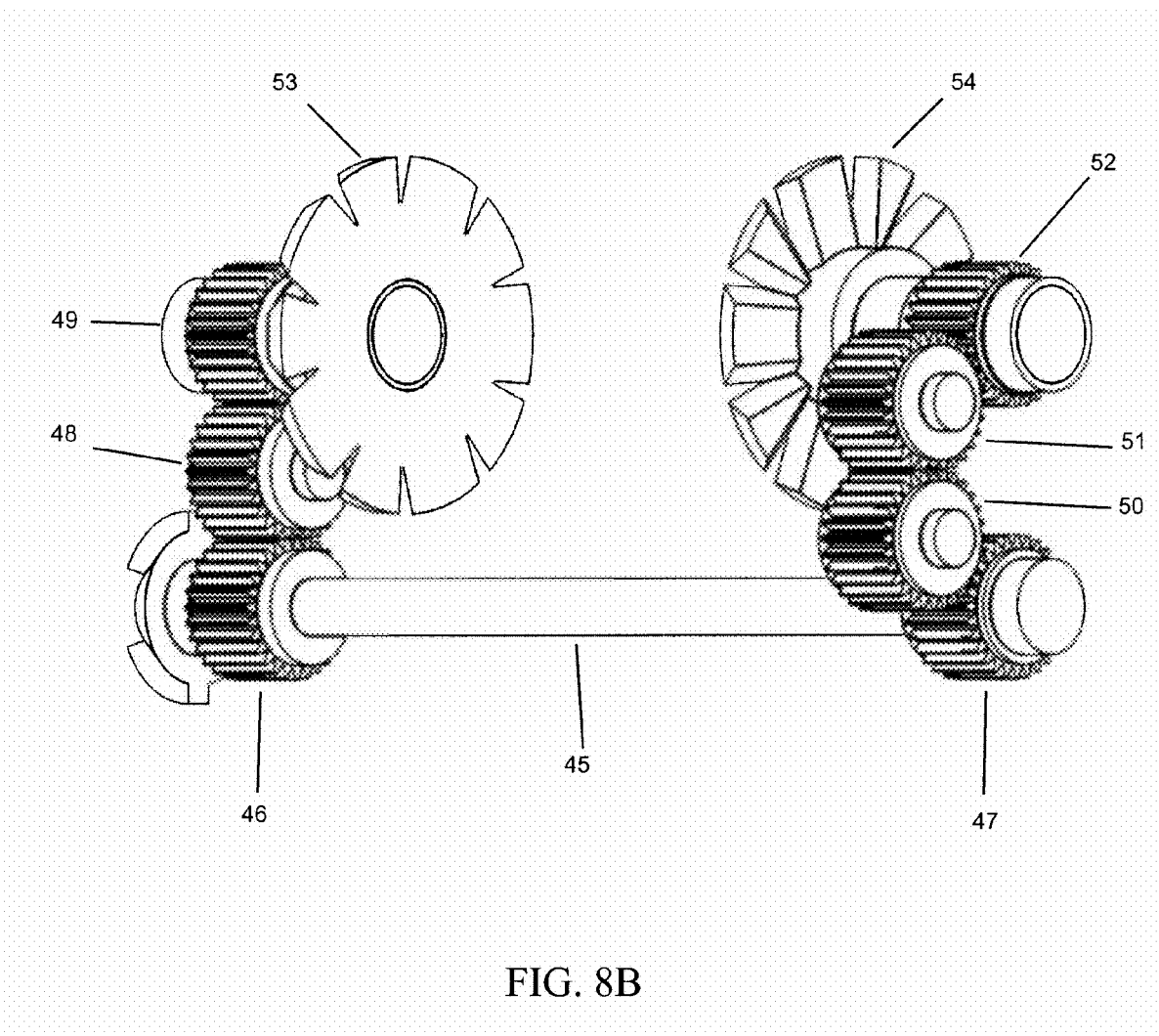
FIG. 8B is a right-side perspective view of the general gear and axle arrangement found in certain embodiments of the present invention, such as the embodiment shown in FIG. 7.

In another embodiment, the terminal wheel has one or more tapered slots cut into the terminal wheel and extending in a straight radial line from the perimeter of the terminal wheel toward the center of the terminal wheel, wherein the slot is wider at the perimeter of the terminal wheel and gets narrower as it moves toward the center of the terminal wheel. These terminal wheels are used by pushing the line into the slot from the perimeter of the terminal wheel toward the center of the terminal wheel. The line is secured by friction between the surface of the line and the walls of the slot. The tapered slot permits the terminal wheel to hold lines of varying thickness because the line will be secured by the slot at the point at which the line's width matches or is larger than the slot's width. This type of terminal wheel is exemplified by terminal wheels 53 and 54 (FIGS. 8A and 8B).

Figure 16:
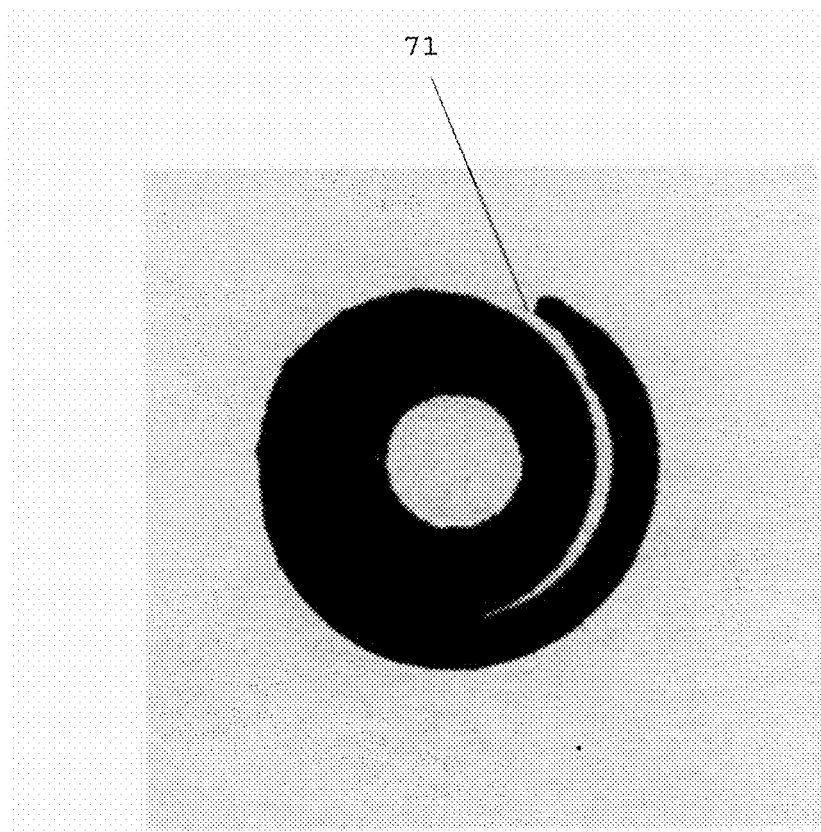
FIG. 16 is a perspective of a "ram's horn" terminal wheel.

In yet another embodiment, the terminal wheel has a "ram's horn" design (FIG. 16). The ram's horn design has one or more slots 71 that gradually taper and get narrower moving from the outside of the terminal wheel to the center of the terminal wheel so as to accommodate line of varying widths at different points along the slot (FIG. 16). Moreover, the slots in the "ram's horn" design extend from the perimeter of the terminal wheel toward the center of the terminal wheel in a spiral manner, creating an infinite screw (FIG. 16). These terminal wheels are used by pushing the line into the slot from the perimeter of the terminal wheel toward the center of the terminal wheel. The line is secured by friction between the surface of the line and the walls of the slot. The "ram's horn" terminal wheel is exemplified by terminal wheels 57 and 58 (FIG. 9).

The knot tying device of the present invention can be used to entwine and knot monofilament fishing line. The use of the device in tying knots is described below in reference to the embodiment shown in FIG. 1. It will be readily appreciated, however, that other embodiments of the present invention are used in an analogous manner.

Figure 6A:
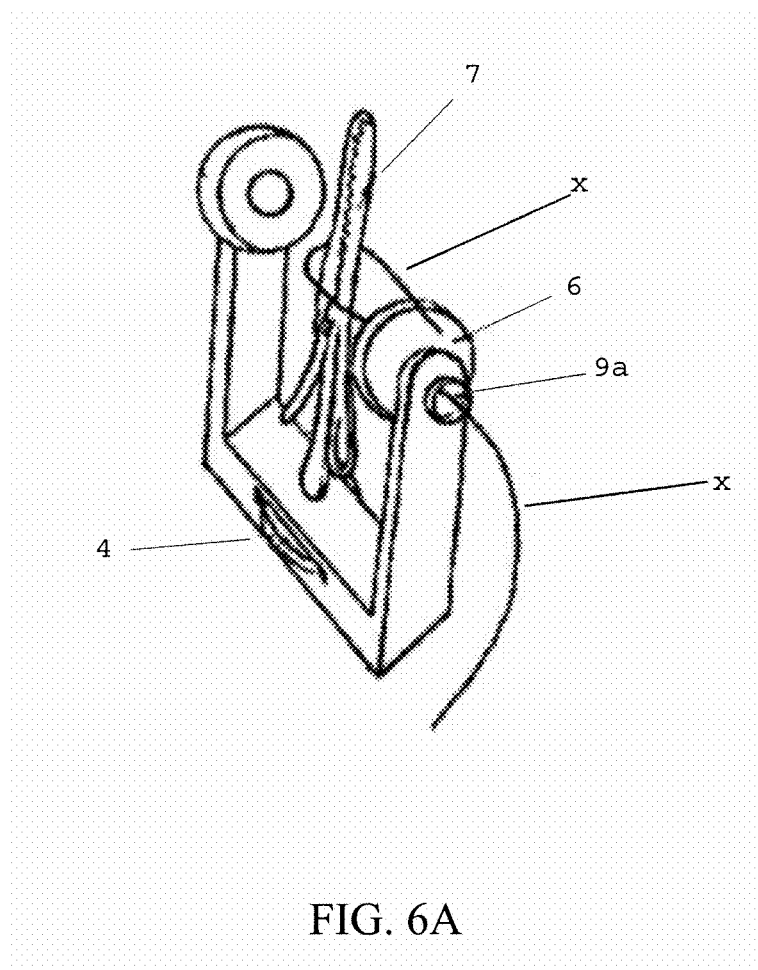
FIG. 6A is a perspective view of the embodiment shown in FIG. 1, showing a line at the beginning of the knot tying process.
Figure 6B:
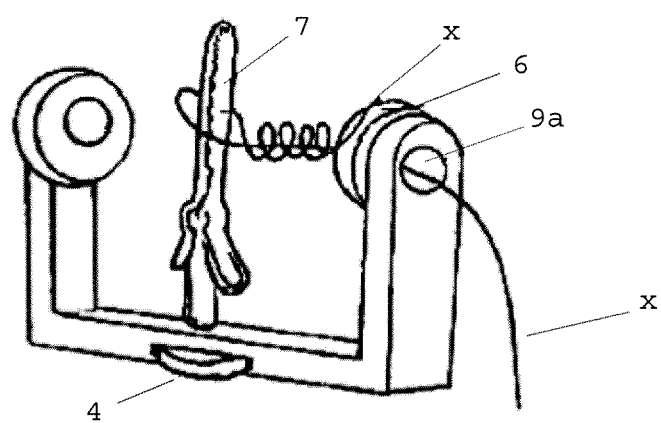
FIG. 6B is a perspective view of the embodiment shown in FIG. 1, showing a line during the knot tying process.
Figure 6C:
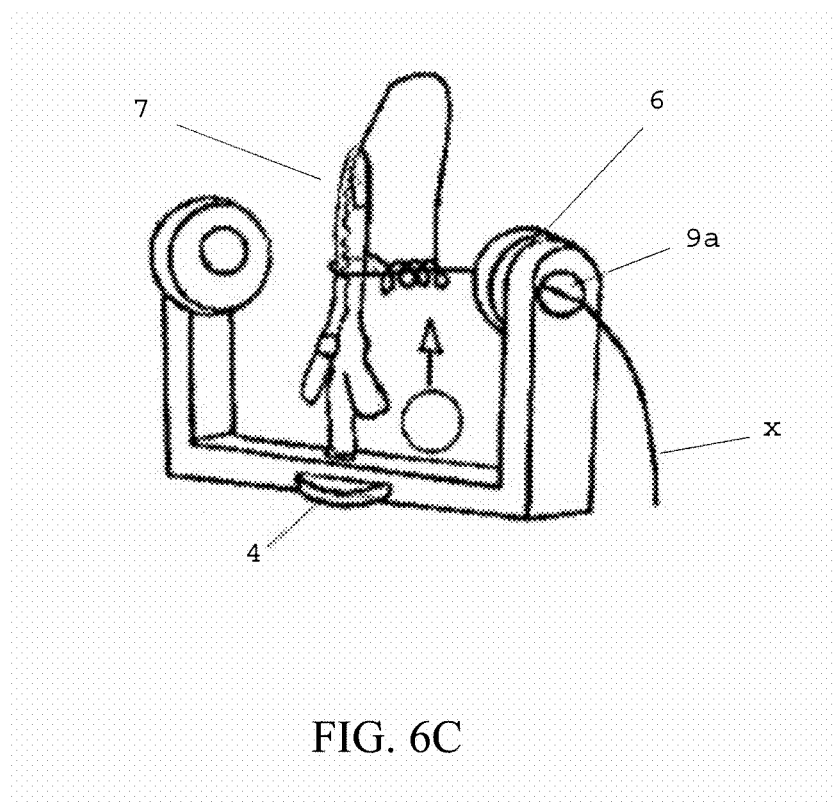
FIG. 6C is a perspective view of the embodiment shown in FIG. 1, showing a line during the knot tying process.

The basic function of the device of the present invention is the entwining of one or more fishing lines. Such entwinement is common to many of the knots that are useful in fishing. The clinch knot, Trilene knot, and Snell knots are all generally used to tie the fishing line to a hook, swivel, or lure. In forming these knots with the device of the present invention, line x is first passed through aperture 9a formed by the right upper sprocket 9 and terminal wheel 6, passed through the eye of the hook or swivel to which the line is to be attached, wrapped around clip 7, and attached at its end to terminal wheel 6 (FIG. 6A). The hook or swivel to which the line is to be attached is positioned on the side of clip 7 opposite to the terminal wheel to which line x is attached. The user then rotates controller 4 to produce rotational energy which wraps line x around itself (FIG. 6B). To complete the basic clinch knot, the user detaches the terminal end of line x from terminal wheel 6 and attaches the terminal end of line x to clip 7 above the loop of line (FIG. 6C). The user then inserts a finger under the entwined line x and pulls up (see circle with upward arrow in FIG. 6C), sliding the loop of line up over clip 7 and over the terminal end of the line that is being held by clip 7, and then pulls the non-entwined portion of line x that is not attached to clip 7 in a direction away from clip 7, thereby causing the entwinements of line x to compress thereby forming the knot. After forming the knot, the user releases the terminal end of line x from clip 7.

In an alternative method, the hook or swivel to which the line is to be attached is held by clip 7 with the eye of the hook or swivel pointing toward terminal wheel 6. The line is passed through aperture 9a formed by right upper sprocket 9 and terminal wheel 6, passed through the eye of the hook or swivel to which the line is to be attached, and attached at its end to terminal wheel 6. The user then rotates controller 4 to produce rotational energy which causes the line to entwine over itself (see FIG. 6B). The basic clinch knot is completed when the user detaches the terminal end of the line from terminal wheel 6, passes the terminal end of the line inside the loop formed by the line around the eye of the hook or swivel, and then pulls the terminal end of line x and the non-terminal portion of line x that is not entwined in opposite directions, thereby causing the entwinements of line x to compress, forming the knot. The knotted hook is then released from clip 7. Using either method, the line with attached hook (or swivel or lure) is removed from the knot-tying device by passing the line and hook out through aperture 9a formed by the right upper sprocket 9 and terminal wheel 6. It will be evident, therefore, that aperture 9a must be large enough to allow passage of the hook, swivel or lure. Indeed, different embodiments of the present invention may have differently sized apertures extending from the outside of the body and through the terminal wheels so as to facilitate hooks, swivels, or lures of varying sizes.

It will be readily apparent to those skilled in the art that other knots related to the clinch knot (e.g., Trilene knot, Snell knot) can be made using the device of the present invention by simple modification of these basic methods. The Trilene knot, for example, is made in a manner similar to the basic clinch knot, except that the line is looped through the eye of the hook (or swivel or lure) twice.

Figure 6D:
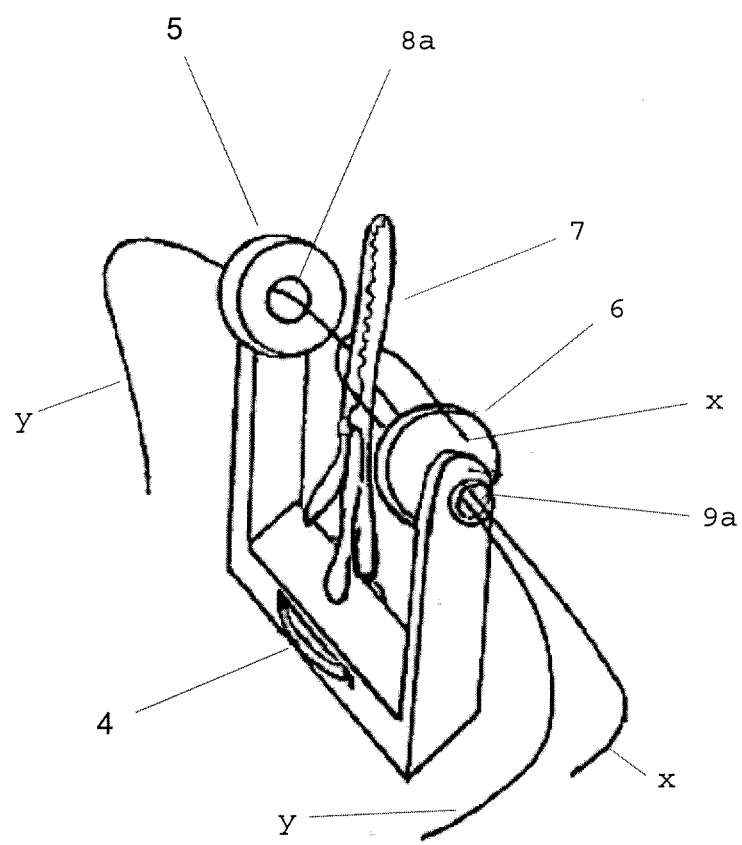
FIG. 6D is a perspective view of the embodiment shown in FIG. 1, showing two lines during the knot tying process.
Figure 6E:
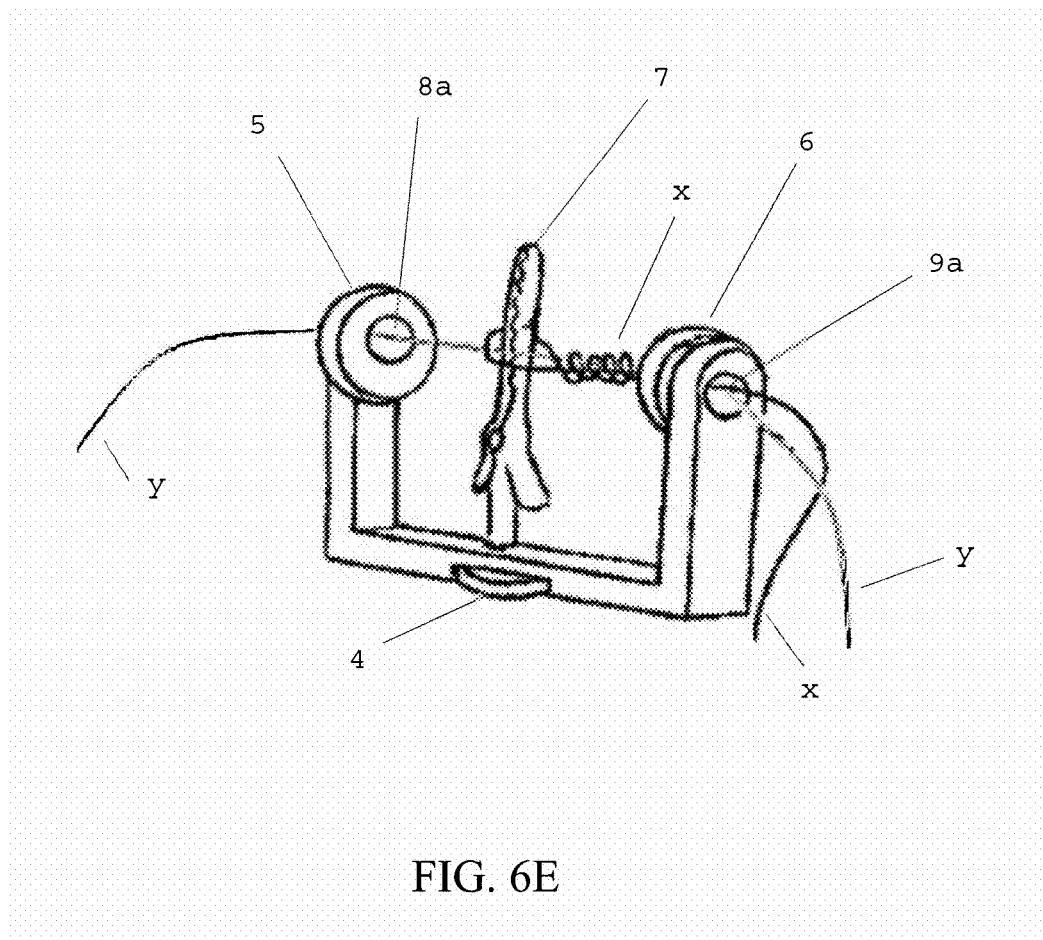
FIG. 6E is a perspective view of the embodiment shown in FIG. 1, showing two lines during the knot tying process.

The knot-tying device of the present invention can also be used to connect two separate lines to each other, such as in a nail knot, blood knot, or Albright knot. The nail knot, for example, can be made using the device of the present invention by passing line y in through aperture 9a formed by the right upper sprocket 9 and right terminal wheel 6, and then out through aperture 8a formed by left terminal wheel 5 and left upper sprocket 8 (FIG. 6D). Line x is then passed through aperture 9a formed by the right upper sprocket 9 and terminal wheel 6, wrapped around clip 7, and attached near its end to terminal wheel 6 (FIG. 6D). The user then rotates controller 4 to produce rotational energy which wraps line x around line y (FIG. 6E). The user completes the nail knot by detaching the terminal end of line x from terminal wheel 6, feeding the terminal end of line x back through the tunnel created by the entwinement of line x around line y, sliding the loop of line x around clip 7 up off of clip 7, and then pulling the terminal end of line x and the portion of line x that is not entwined in opposite directions, thereby causing compression of the entwinements of line x around line y and forming the knot.

Figure 6F:
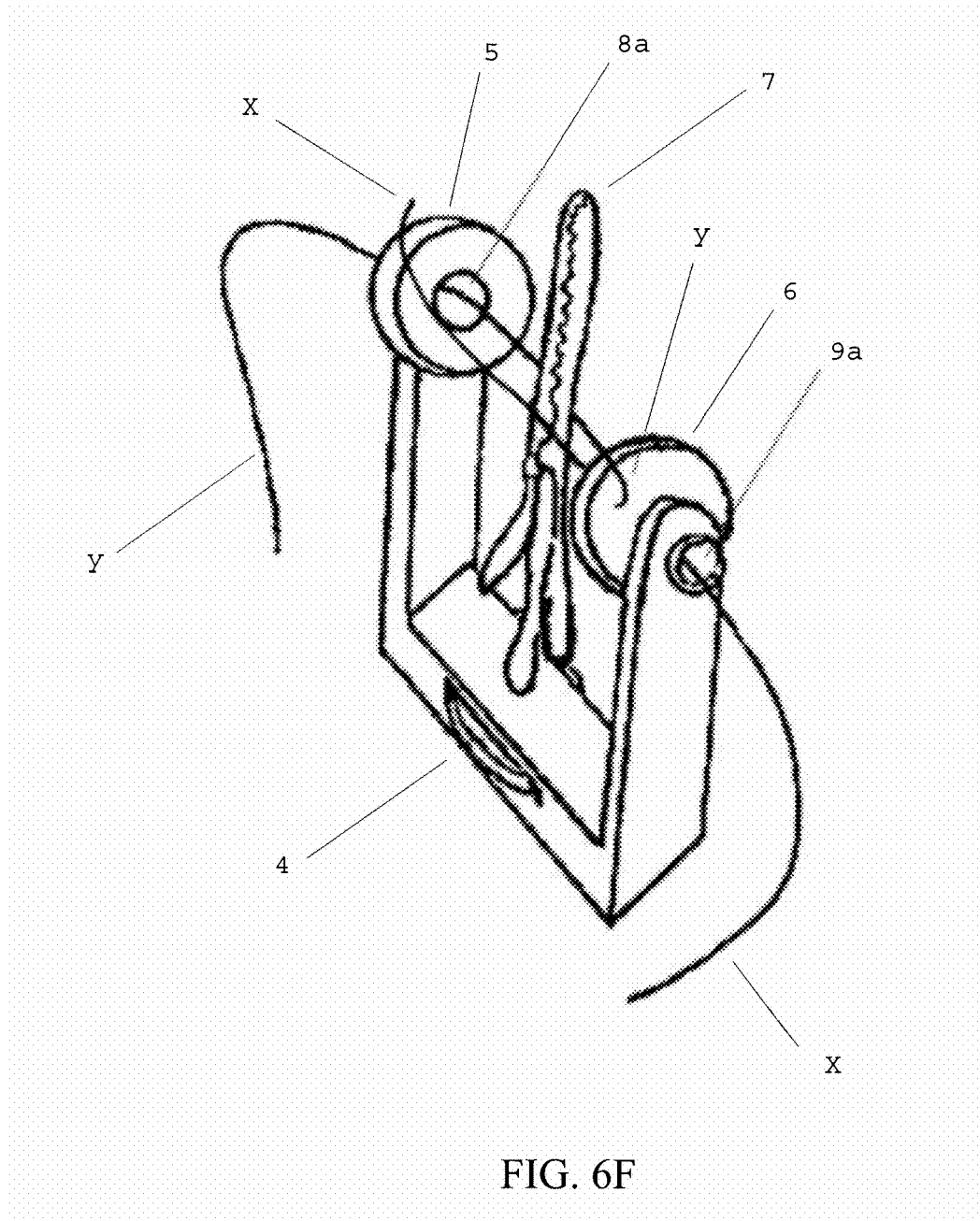
FIG. 6F is a perspective view of the embodiment shown in FIG. 1, showing two lines during the knot tying process.
Figure 6G:
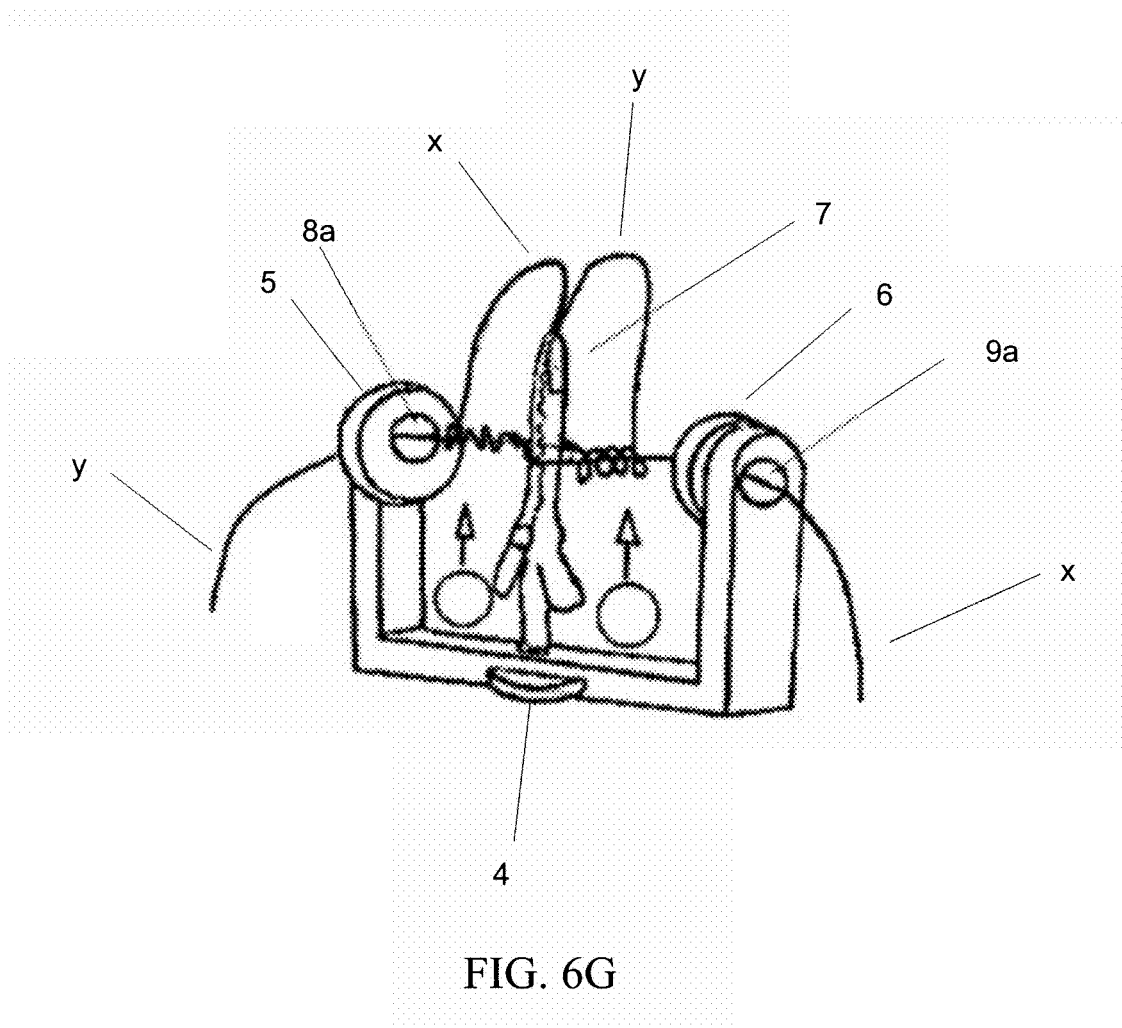
FIG. 6G is a perspective view of the embodiment shown in FIG. 1, showing two lines during the knot tying process.

Another common knot for joining two different lines is the blood knot. The blood knot is formed using the device of the present invention as follows. Line x is passed through aperture 9a formed by the right upper sprocket 9 and terminal wheel 6 and then attached to left terminal wheel 5 (FIG. 6F). Line y is passed through aperture 8a formed by the left upper sprocket 8 and terminal wheel 5 and then attached to right terminal wheel 6 (FIG. 6F). Lines x and y are positioned on opposite sides of clip 7 (FIG. 6F). The user rotates controller 4 to produce rotational energy which causes line x and y to entwine (see FIG. 6G). The user then detaches the end of line x from terminal wheel 5 and attaches it to clip 7. The user then detaches the end of line y from terminal wheel 6 and attaches it to clip 7 (FIG. 6G). The user then inserts a finger under the entwined lines under either side of clip 7 and pulls up (see circles with upward arrow in FIG. 6G), sliding the loop of line up over clip 7 and over the terminal ends of lines x and y (which are being held by clip 7), and then pulls the non-terminal portions of lines x and y in opposite directions. The pulling motion causes the entwinements of line x and line y to compress thereby forming the blood knot.

The invention claimed is:

1. A knot tying device, said device comprising:
   a body, wherein said body comprises a right side, a left side, and a center;
   a controller, wherein said controller is attached to said body, and is capable of being manually rotated by a user of the device;
   a right terminal wheel capable of securely holding a line, wherein said right terminal wheel is attached to the right side of said body;
   a left terminal wheel capable of securely holding a line, wherein said left terminal wheel is attached to the left side of said body;
   means for transferring rotational energy imparted to said controller to said right terminal wheel and said left terminal wheel, such that rotation of said controller results in rotation of said left terminal wheel and rotation of said right terminal wheel, wherein said left terminal wheel and said right terminal wheel rotate simultaneously, at the same speed, and in opposite directions;
   one or more clips, wherein said clips are attached to the center of said body and positioned between said left terminal wheel and said right terminal wheel;
   a right side aperture, wherein said right side aperture extends from the outside of the right side of said body through the center of said right terminal wheel; and
   a left side aperture, wherein said left side aperture extends from the outside of the left side of said body through the center of said left terminal wheel.

2. The device of claim 1, wherein said one or more clips comprises two clips.

3. The device of claim 1 wherein said right terminal wheel comprises one or more slots extending from the perimeter of said right terminal wheel toward the center of said right terminal wheel in a spiral manner, and wherein said one or more slots gradually taper and narrow in moving from the perimeter of said right terminal wheel toward the center of said right terminal wheel; and wherein said left terminal wheel comprises one or more slots extending from the perimeter of said left terminal wheel toward the center of said left terminal wheel in a spiral manner, and wherein said one or more slots gradually taper and narrow in moving from the perimeter of said left terminal wheel toward the center of said left terminal wheel.

4. A knot tying device, said device comprising:
   a body, wherein said body comprises a right side, a left side, and a center;
   a controller, wherein said controller is attached to said body, and is capable of being manually rotated by a user of the device;
   a center sprocket, wherein said center sprocket is attached to said controller and rotates with said controller at the same speed and in the same direction;
   a right horizontal sprocket, a left horizontal sprocket and a base chain, wherein said base chain engages each of said center sprocket, said right horizontal sprocket, and said left horizontal sprocket;
   a right horizontal miter gear mounted on said right horizontal sprocket, wherein said right horizontal miter gear rotates simultaneously with, at the same speed as, and in the same direction as said right horizontal sprocket;

a left horizontal miter gear mounted on said left horizontal sprocket, wherein said left horizontal miter gear rotates simultaneously with, at the same speed as, and in the same direction as said left horizontal sprocket;

a right vertical sprocket, a right upper sprocket, and a right roller chain, wherein said right roller chain engages each of said right vertical sprocket and said right upper sprocket;

a right vertical miter gear mounted on said right vertical sprocket, wherein said right vertical miter gear engages said right horizontal miter gear and said right vertical miter gear rotates simultaneously with, at the same speed as, and in the same direction as said right vertical sprocket;

a left vertical sprocket, a left upper sprocket, and a left roller chain, wherein said left roller chain engages each of said left vertical sprocket and said left upper sprocket;

a left vertical miter gear mounted on left vertical sprocket, wherein said left vertical miter gear engages said left horizontal miter gear and said left vertical miter gear rotates simultaneously with, at the same speed as, and in the same direction as said left vertical sprocket;

a right terminal wheel capable of securely holding a line, wherein said right terminal wheel is mounted on said right upper sprocket, wherein said right terminal wheel rotates simultaneously with, at the same speed as, and in the same direction as said right upper sprocket;

a left terminal wheel capable of securely holding a line, wherein said left terminal wheel is mounted on said left upper sprocket, wherein said left terminal wheel rotates simultaneously with, at the same speed as, and in the same direction as said left upper sprocket;

wherein rotation of said left and right horizontal miter gears causes rotation of said left and right vertical miter gears; and wherein said left vertical miter gear rotates simultaneously with, at the same speed as, and in the opposite direction as said right vertical miter gear;

one or more clips, wherein said clips are attached to the center of said body and positioned between said left terminal wheel and said right terminal wheel;

a right side aperture, wherein said right side aperture extends from the outside of the right side of said body through the center of said right terminal wheel; and a left side aperture, wherein said left side aperture extends from the outside of the left side of said body through the center of said left terminal wheel.

5. The device of claim 4, wherein said one or more clips comprises two clips.

6. The device of claim 4 wherein said right terminal wheel comprises one or more slots extending from the perimeter of said right terminal wheel toward the center of said right terminal wheel in a spiral manner, and wherein said one or more slots gradually taper and narrow in moving from the perimeter of said right terminal wheel toward the center of said right terminal wheel; and wherein said left terminal wheel comprises one or more slots extending from the perimeter of said left terminal wheel toward the center of said left terminal wheel in a spiral manner, and wherein said one or more slots gradually taper and narrow in moving from the perimeter of said left terminal wheel toward the center of said left terminal wheel.

7. A knot tying device, said device comprising:
a body, wherein said body comprises a right side, a left side, and a center;

a controller, wherein said controller is attached to said body such that said controller is capable of being manually rotated by a user of the device;

an axle, wherein said axle is a cylinder having a left end, a right end, and a longitudinal axis, wherein said controller is attached to said axle such that rotation of said controller by a user results in rotation of said axle about said axle's longitudinal axis;

a right pinion gear, wherein said right pinion gear is attached to said axle near the right end of said axle;

a left pinion gear, wherein said left pinion gear is attached to said axle near the left end of said axle;

a right upper spur gear;

one or more sequentially engaged right spur gears, wherein the lowermost of said sequentially engaged one or more right spur gears engages said right pinion gear, and the uppermost of said sequentially engaged right spur gears engages said right upper spur gear, such that rotation of said right pinion gear causes rotation of said right spur gear;

a left upper spur gear;

one or more sequentially engaged left spur gears, wherein the lowermost of said sequentially engaged one or more left spur gears engages said left pinion gear, and the uppermost of said sequentially engaged left spur gears engages said left upper spur gear, such that rotation of said left pinion gear causes rotation of said left spur gear;

a right terminal wheel capable of securely holding a line, wherein said right terminal wheel is attached to said right upper spur gear, wherein said right terminal wheel rotates simultaneously with, at the same speed as, and in the same direction as said right upper spur gear;

a left terminal wheel capable of securely holding a line, wherein said left terminal wheel is attached to said left upper spur gear, wherein said left terminal wheel rotates simultaneously with, at the same speed as, and in the same direction as said left upper spur gear;

one or more clips, wherein said clips are attached to the center of said body and positioned between said left terminal wheel and said right terminal wheel;

a right side aperture, wherein said right side aperture extends through the right side of said body and through the center of said right terminal wheel; and a left side aperture, wherein said left side aperture extends through the left side of said body and through the center of said left terminal wheel.

8. The device of claim 7, wherein said one or more clips comprises two clips.

9. The device of claim 7 wherein said right terminal wheel comprises one or more slots extending from the perimeter of said right terminal wheel toward the center of said right terminal wheel in a spiral manner, and wherein said one or more slots gradually taper and narrow in moving from the perimeter of said right terminal wheel toward the center of said right terminal wheel; and wherein said left terminal wheel comprises one or more slots extending from the perimeter of said left terminal wheel toward the center of said left terminal wheel in a spiral manner, and wherein said one or more slots gradually taper and narrow in moving from the perimeter of said left terminal wheel toward the center of said left terminal wheel.

10. A knot tying device, said device comprising:
a body, wherein said body comprises a right side, a left side, and a center;

a controller, wherein said controller is attached to said body such that said controller is capable of being manually rotated by a user of the device, and wherein said controller is a circular gear having an outer surface that is contacted by the user and an inner surface that comprises gear teeth;

an axle, wherein said axle is a cylinder having a left end, a right end, and a longitudinal axis;

a right pinion gear, wherein said right pinion gear is attached to said axle near the right end of said axle such that rotation of said right pinion gear causes rotation of said axle about the longitudinal axis of said axle;

a left pinion gear, wherein said left pinion gear is attached to said axle near the left end of said axle such that rotation of said left pinion gear causes rotation of said axle about the longitudinal axis of said axle;

wherein said gear teeth of said controller engages one of either said right pinion gear or said left pinion gear such that rotation of said controller causes rotation of one of either said right pinion gear or said left pinion gear;

a right upper spur gear;

one or more sequentially engaged right spur gears, wherein the lowermost of said sequentially engaged one or more right spur gears engages said right pinion gear, and the uppermost of said sequentially engaged right spur gears engages said right upper spur gear, such that rotation of said right pinion gear causes rotation of said right spur gear;

a left upper spur gear;

one or more sequentially engaged left spur gears, wherein the lowermost of said sequentially engaged one or more left spur gears engages said left pinion gear, and the uppermost of said sequentially engaged left spur gears engages said left upper spur gear, such that rotation of said left pinion gear causes rotation of said left spur gear;

a right terminal wheel capable of securely holding a line, wherein said right terminal wheel is attached to said right upper spur gear, wherein said right terminal wheel rotates simultaneously with, at the same speed as, and in the same direction as said right upper spur gear;

a left terminal wheel capable of securely holding a line, wherein said left terminal wheel is attached to said left upper spur gear, wherein said left terminal wheel rotates simultaneously with, at the same speed as, and in the same direction as said left upper spur gear;

one or more clips, wherein said clips are attached to the center of said body and positioned between said left terminal wheel and said right terminal wheel;

a right side aperture, wherein said right side aperture extends through the right side of said body and through the center of said right terminal wheel; and a left side aperture, wherein said left side aperture extends through the left side of said body and through the center of said left terminal wheel.

11. The device of claim 10, wherein said one or more clips comprises two clips.

12. The device of claim 10 wherein said right terminal wheel comprises one or more slots extending from the perimeter of said right terminal wheel toward the center of said right terminal wheel in a spiral manner, and wherein said one or more slots gradually taper and narrow in moving from the perimeter of said right terminal wheel toward the center of said right terminal wheel; and wherein said left terminal wheel comprises one or more slots extending from the perimeter of said left terminal wheel toward the center of said left terminal wheel in a spiral manner, and wherein said one or more slots gradually taper and narrow in moving from the perimeter of said left terminal wheel toward the center of said left terminal wheel.

13. A method of tying a knot comprising using the knot-tying device of claim 1.

14. The method of claim 13, wherein said knot is selected from the group consisting of clinch knot, blood knot, Trilene knot, Snell knot, Albright knot, and nail knot.

15. The method of claim 14, wherein said knot is a clinch knot.

16. The method of claim 14, wherein said knot is a blood knot.

17. The method of claim 14, wherein said knot is a Trilene knot.

18. The method of claim 14, wherein said knot is a Snell knot.

19. The method of claim 14, wherein said knot is an Albright knot.

20. The method of claim 14, wherein said knot is a nail knot.

* * * * *